(12) United States Patent
Dantas de Castro et al.

(10) Patent No.: US 11,050,608 B1
(45) Date of Patent: *Jun. 29, 2021

(54) DYNAMIC, INTERACTIVE OBJECTS FOR POSTING

(71) Applicant: Google LLC, Mountain View, CA (US)

(72) Inventors: Rafael Dantas de Castro, Belo Horizonte (BR); Rodrigo Barra de Almeida, Belo Horizonte (BR); Torsten Paul Nelson, Belo Horizonte (BR); Irene Chung, Mountain View, CA (US); Dennis Troper, Los Altos, CA (US); Wayne Crosby, San Mateo, CA (US); Ayush Agarwal, Palo Alto, CA (US)

(73) Assignee: Google LLC, Mountain View, CA (US)

( * ) Notice: Subject to any disclaimer, the term of this patent is extended or adjusted under 35 U.S.C. 154(b) by 330 days.

This patent is subject to a terminal disclaimer.

(21) Appl. No.: 15/704,290

(22) Filed: Sep. 14, 2017

Related U.S. Application Data

(63) Continuation of application No. 14/074,588, filed on Nov. 7, 2013, now Pat. No. 9,800,458.

(60) Provisional application No. 61/823,366, filed on May 14, 2013.

(51) Int. Cl.
*H04L 12/24* (2006.01)

(52) U.S. Cl.
CPC ................ *H04L 41/0233* (2013.01)

(58) Field of Classification Search
CPC ..... H04L 41/00; H04L 41/0233; H04L 67/10; H04L 67/02; G06F 8/30; G06F 8/20; G06F 3/0484

USPC .............. 709/219, 218, 217, 230, 231, 204
See application file for complete search history.

(56) References Cited

U.S. PATENT DOCUMENTS

| | | | |
|---|---|---|---|
| 5,875,335 A | 2/1999 | Beard | |
| 6,892,181 B1* | 5/2005 | Megiddo | G06Q 30/02 705/1.1 |
| 7,313,802 B1* | 12/2007 | Tomsen | G06Q 30/02 348/E7.071 |
| 8,572,591 B2 | 10/2013 | Cwalina et al. | |
| 9,098,179 B2 | 8/2015 | Sanoy | |
| 2008/0195523 A1* | 8/2008 | Rabenold | G06Q 30/06 705/37 |
| 2008/0300023 A1* | 12/2008 | Kim | H04M 1/72522 455/566 |
| 2010/0100591 A1 | 4/2010 | Mahaffey et al. | |
| 2012/0150620 A1* | 6/2012 | Mandyam | G06Q 30/0239 705/14.39 |
| 2014/0130182 A1* | 5/2014 | Yackanich | G06F 21/60 726/27 |
| 2014/0278935 A1 | 9/2014 | Gara | |

\* cited by examiner

*Primary Examiner* — Ario Etienne
*Assistant Examiner* — Sahera Halim
(74) *Attorney, Agent, or Firm* — Fish & Richardson P.C.

(57) ABSTRACT

A system including a processor and a memory storing instructions that, when executed, cause the system to: generate a dynamic object having rich content, interactive code and multiple platform operability logic that allows the interactive code to operate on a plurality of platforms; send the dynamic object to one of the plurality of platforms; process the dynamic object on the one of the plurality of platforms; and provide one or more interfaces for user engagement to perform an interaction specified by the dynamic object.

20 Claims, 33 Drawing Sheets

Mobile poll

DYNAMIC, INTERACTIVE OBJECTS FOR POSTING

CROSS REFERENCE

This application is a continuation of and claims priority to U.S. application Ser. No. 14/074,588, filed Nov. 7, 2013, titled "Dynamic, Interactive Objects for Posting," which claims priority from the following U.S. provisional patent application, in its entirety: Ser. No. 61/823,366, filed on May 14, 2013 and entitled "Dynamic, Interactive Objects for Posting," the entireties of which are hereby incorporated by reference.

BACKGROUND

There are a number of services or computing platforms that have proliferated recently. For example, social networks, videos viewing services, email services or document services based in the cloud or accessible via the Internet have all become popular. While users may join such services, they many have difficulty using many of the features offered by such systems and accessing the information provided by such systems. In particular for social networks, corporations and other business entities have created profiles and begun to use these platforms for sharing information and other uses.

It may be difficult for users, including corporations and other business, to manage their profiles and presence on different platforms such as social networks, the Internet, third-party sites, ad networks, video sharing sites, etc. If an entity wants to distribute branded content, it may be difficult because they must interact with each of the individual platform separately and generate content specific for each of those platforms. Adapting the presentation of the content to each of these platforms can also be challenging. Furthermore, it is difficult to determine in each of the different platforms how to present content and increase user engagement with the content.

SUMMARY

According to one innovative aspect of the subject matter in this disclosure, a system including a processor and a memory storing instructions that, when executed, cause the system to: generate a dynamic object having rich content, interactive code and multiple platform operability logic that allows the interactive code to operate on a plurality of platforms; send the dynamic object to one of the plurality of platforms; process the dynamic object on the one of the plurality of platforms; and provide one or more interfaces for user engagement to perform an interaction specified by the dynamic object.

In general, another innovative aspect of the subject matter described in this disclosure may be embodied in methods that include: generating a dynamic object having rich content, interactive code and multiple platform operability logic that allows the interactive code to operate on a plurality of platforms; sending the dynamic object to one of the plurality of platforms; processing the dynamic object on the one of the plurality of platforms; and providing one or more interfaces for user engagement to perform an interaction specified by the dynamic object.

Other implementations of one or more of these aspects include corresponding systems, apparatus, and computer programs, configured to perform the actions of the methods, encoded on computer storage devices.

These and other implementations may each optionally include one or more of the following features. For instance, the operations may further include saving the dynamic object in association with a user; determining whether a trigger has been satisfied; and in response to the trigger being satisfied, presenting the dynamic object to the user using the platform. For instance, the features may further include that the rich content includes text, images and videos, the interactive code is capable of providing and presenting interfaces including accepting input and modifying the content presented, the multiple platform operability logic includes logic that allows the interactive code to present the rich content, the dynamic object further comprises the presentation logic for adapting the rich content to be presented to the user in a format suitable to a display system on one of the plurality of platforms, and measurement logic for measuring and reporting use and interaction with the dynamic object in a manner suitable to one of the plurality of platforms, the platform is one from the group of a social network server, an advertising server, an advertising network, a search server, a mobile server, an endorsement server, an email server, and a third party server, the dynamic object is sent to a plurality of platforms and is processed by the plurality of platforms based on the multiple platform operability logic to provide the dynamic object suitable to each of the plurality of platforms, the interactive code generates and present one from the group of an offer, a poll, a catalog, a listing, a transaction and installation of an application, and the trigger is one from the group of a lapse of time, a location of the user, an activity of the user, an interaction of a user with a particular user or group of other users, viewing a post on a topic, viewing a post by a company, and any change of state in a social network.

These implementations are particularly advantageous in a number of respects. For instance, the technology described herein provides an architecture including unified interface for brands and businesses, dynamic object creation and execution on multiple platforms. Additionally, the dynamic objects are cross platform operational for interaction and presentation. Further, the dynamic objects provide for analytics and data collection on a per dynamic object basis. Finally, the dynamic objects allow correlations between the action taken within post to position or state in social media.

BRIEF DESCRIPTION OF THE DRAWINGS

The present disclosure is illustrated by way of example, and not by way of limitation in the figures of the accompanying drawings in which like reference numerals are used to refer to similar elements.

DETAILED DESCRIPTION

The present disclosure relates to a system and methods for processing rich, dynamic interactive objects. While the present disclosure is described below in the context of dynamic objects generated for and injected into a social network and viewable on a desktop computer or mobile computing device, it should be understood that the principles of the present disclosure are applicable to other areas. For example, the present disclosure may be applied to presenting related content in a broader system that includes email, video sharing, social networking, calendaring, mapping, music sharing, newsfeeds, online documents, spreadsheets, presentations, storage, etc. More specifically, the dynamic objects may be adapted such that they are operable on any of those types of systems.

Figure 1:
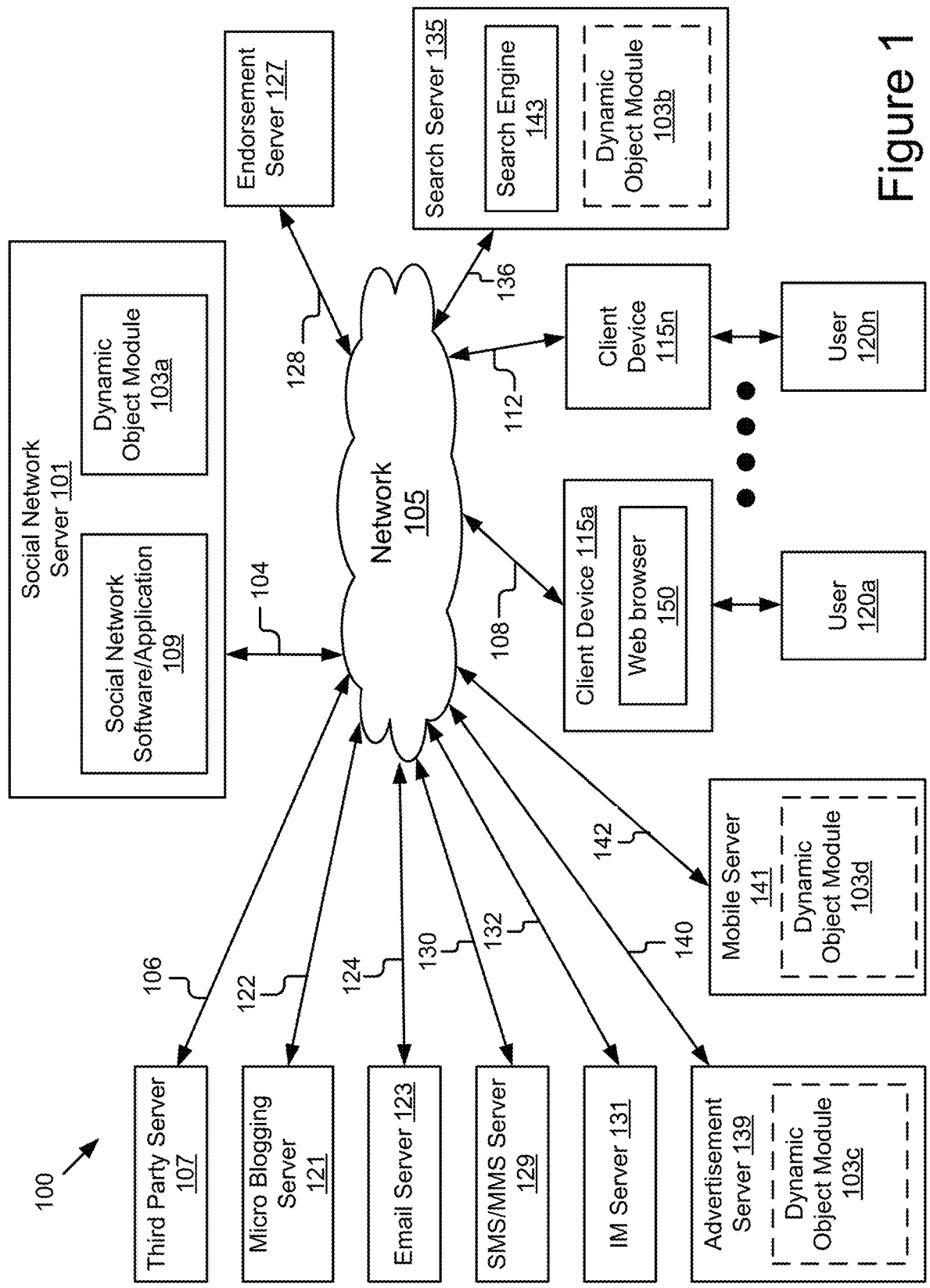
FIG. 1 is a high-level block diagram illustrating an example system for processing rich, dynamic interactive objects.

FIG. 1 illustrates a high-level block diagram of a system 100 for rich, dynamic interactive objects according to some implementations of the present disclosure. The illustrated system 100 includes client devices 115a-115n (also referred to herein individually and collectively as 115) that are accessed by users 120a-120n (also referred to herein individually and collectively as 120), and a social network server 101 having a user interaction improvement module 103. The system 100 also includes a number of products or services offered by a social network server 101, a third party server 107, a micro blogging server 121, an email server 123, an endorsement server 127, a Short Message Service (SMS)/Multimedia Messaging Service (MIMS) server 129, an Instant Messaging (IM) server 131, a search server 135, an advertisement server or advertisement network 139 and a mobile server 141. In the illustrated implementation, these entities are communicatively coupled via a network 105. These other systems 101, 107, 121, 123, 127, 129, 131, 135, 139 and 141 are merely examples and the system 100 in some implementations includes a document server, a blogging server, a news feed server, a video sharing server, a photo sharing server, a map server and any other third party server, etc.

The client devices 115a-115n in FIG. 1 are used by way of example. While FIG. 1 illustrates two client devices 115a and 115n, the present disclosure applies to any system architecture having one or more client devices 115. Furthermore, while only one network 105 is coupled to the client devices 115a-115n, the social network server 101 and the other product servers 107, 121, 123, 127, 129, 131, 135, 139 and 141, in practice one or more networks 105 can be connected to the entities. Furthermore, while only one third party server 107 is shown, the system 100 may include one or more third party servers 107.

In some implementations, the social network server 101 is coupled to the network 105 via signal line 104. The social network server 101 also includes a social network software/application 109. Although only one social network server 101 is shown, it should be recognized that multiple servers may be present. A social network may be any type of social structure where the users are connected by a common feature. The common feature includes relationships or connections, e.g., friendship, family, work, an interest, etc. The common features are provided by one or more social networking systems, for example, those included in the system 100, including explicitly-defined relationships and relationships implied by social connections with other online users, where the relationships form a social graph. In some examples, the social graph can reflect a mapping of these users and how they are related. Furthermore, it should be understood that the social network server 101 and the social network software/application 109 are representative of one social network and that there may be multiple social networks coupled to the network 105, each having its own server, application and social graph. For example, a first social network may be more directed to business networking, a second may be more directed to or centered on academics, a third may be more directed to local business, a fourth may be directed to dating and others of general interest or a specific focus.

While shown as operational on the social network server 101 in FIG. 1, in some implementations all or part of the dynamic object module 103a (also referred to herein individually and collectively as 103) may be operational on the third party server 107 or any other servers 101, 121, 123, 127, 129, 131, 135, 139 and 141. For example, the search server 135 may include dynamic object module 103b, advertisement server 139 may include dynamic object model 103c or mobile server 141 may include the dynamic object module 103d. The dynamic object module 103 interacts with the other servers 101, 107, 121, 123, 127, 129, 131, 135, 139 and 141 via the network 105. The dynamic object module 103 is also coupled for communication with the client device 115a, which is connected to the network 105 via signal line 108. The user 120a interacts with the client device 115a. Similarly, the client device 115n is coupled to the network 105 via signal line 112 and the user 120n interacts with the client device 115n. It should be recognized that the dynamic object module 103 can be stored in any combination of the devices and servers, or in only one of the devices or servers.

The network 105 may be a conventional type, wired or wireless, and may have any number of configurations, for example, a star configuration, token ring configuration or other configurations. Furthermore, the network 105 may include a local area network (LAN), a wide area network (WAN) (e.g., the Internet), and/or any other interconnected data path across which multiple devices may communicate. In some implementations, the network 105 may be a peer-to-peer network. The network 105 may also be coupled to or include portions of a telecommunications network for sending data in a variety of different communication protocols. In some implementations, the network 105 includes Bluetooth communication networks or a cellular communications network for sending and receiving data, e.g., via short messaging service (SMS), multimedia messaging service (MMS), hypertext transfer protocol (HTTP), direct data connection, WAP, email, etc.

The social network server 101 is coupled to the network 105 via signal line 104 for communication and cooperation with the other components of the system 100. The social network server 101 interacts with the third party server 107 that is coupled to the network 105 via signal line 106, the micro blogging server 121 that is coupled to the network 105 via signal line 122, the email server 123 that is coupled to the network 105 via signal line 124, the Short Message Service (SMS)/Multimedia Messaging Service (MMS) server 129 that is coupled to the network 105 via signal line 130, the instant messaging (IM) server 131 that is coupled to the network 105 via signal line 132, the search server 135 that is coupled to the network 105 via signal line 136, the endorsement server 127 that is coupled to the network 105 via signal line 128, the advertisement server or network 139 that is coupled to the network 105 via signal line 140, or the mobile server 141 that is coupled to the network 105 by signal line 142.

In some implementations, the social network server 101 receives and sends data and social information provided by the other systems 107, 121, 123, 127, 129, 131, 135, 139 and 141 in a social network. For example, the social network server 101 receives and sends any social information or events performed on any web pages and/or applications hosted by the other systems 101, 107, 121, 123, 129, 131, 135, 139 and 141. The social network server 101 also sends dynamic objects for execution in part on other systems. The web pages, applications or dynamic objects include a user interface allowing a user to interact with, comment or endorse a product, a video, a search result, a widget, a post, a comment, a photo, an article, etc., shown on the web pages and/or applications.

In some implementations, the social network server 101, the third party server 107, the micro blogging server 121, the email server 123, the endorsement server 127, the SMS/MMS server 129, the IM server 131, the search server 135, the advertisement server 139 or the mobile server 141 are hardware servers including a processor, a memory, and network communication capabilities. The client devices 115 can be portable computing devices. It should be understood that these systems 101, 107, 115, 121, 123, 127, 129, 131, 135, 139 and 141 could be any computing device, for example, a laptop computer, a desktop computer, a tablet computer, a mobile telephone, a personal digital assistant (PDA), a mobile email device, a portable game player, a portable music player, a television with one or more processors embedded therein or coupled thereto or any other electronic device capable of accessing a network. As will be described below, it should be understood that the present technologies can operate on different models other than a client-server architecture. For example, the client devices 115 may include the dynamic object module 103 and include different services.

Figure 2:
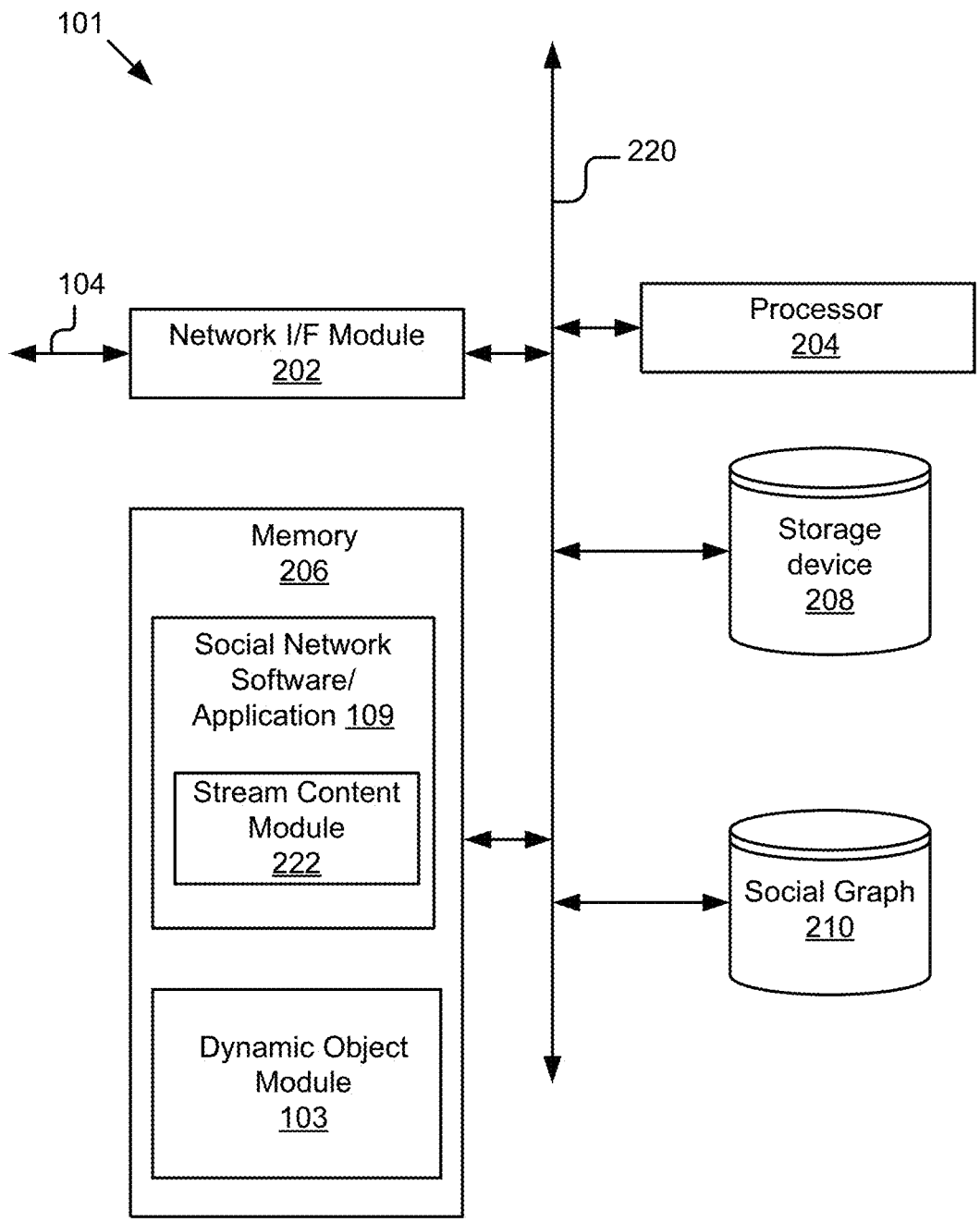
FIG. 2 is a block diagram illustrating an example social network server including a dynamic object module.

FIG. 2 illustrates the social network server 101 according to some implementations of the present disclosure. In this implementation, the social network server 101 includes the network interface (I/F) module 202, a processor 204, a memory 206, a storage device 208 and a social graph 210. These components of the social network server 101 are communicatively coupled to a bus or software communication mechanism 220 for communication with each other.

The network interface module 202 is coupled to the network 105 by signal line 104. The network interface module 202 is also coupled to the bus 220. The network interface module 202 includes ports for wired connectivity including but not limited to USB, SD, or CAT-5, etc. The network interface module 202 links the processor 204 to the network 105 that may in turn be coupled to other processing systems. The network interface module 202 provides other conventional connections to the network 105 using standard network protocols, e.g., TCP/IP, HTTP, HTTPS and SMTP.

In some implementations, the network interface module 202 includes a transceiver for sending and receiving signals using WiFi, Bluetooth® or cellular communications for wireless communication.

The processor 204 may include an arithmetic logic unit, a microprocessor, a general purpose controller or some other processor array to perform computations and provide electronic display signals to a display device. The processor 204 is coupled to the bus 220 for communication with the other components. Processor 204 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors may be included. It should be understood that other processors, operating systems, sensors, displays and physical configurations are possible.

The memory 206 stores instructions and/or data that may be executed by the processor 204. In the illustrated implementation, the memory 206 stores the dynamic object module 103 and the social network application 109 having a stream content module 222. The dynamic object module 103 may cooperate with the social network application 109 to generate dynamic objects, introduce the dynamic objects into the social network and interact with dynamic objects operable on the social network server 101 or command devices 115. The operation of the dynamic object module 103 is described in more detail below with reference to FIGS. 3 and 5-8. The dynamic object module 103 may be software including routines for generating and processing dynamic objects. In some implementations, the dynamic object module 103 may be a set of instructions executable by the processor 204 to provide the functionality described below for generating and processing dynamic objects. In some implementations, the dynamic object module 103 may be stored in the memory 206 of the server 101 and is accessible and executable by the processor 204. In some implementations, the dynamic object module 103 may be adapted for cooperation and communication with the processor 204 and other components of the server 101 via bus 220.

The social network application 109 is shown as including the stream content module 222. Based upon the user's interests, social graph, interactions and other factors, the social network application 109, in particular the stream content module 222, may generate a stream of content tailored to the interests of the user. As will be described below, the dynamic object module 103 generates dynamic objects, introduces the dynamic objects into the social network and interacts with dynamic objects operable on the components of the system 100. These dynamic objects may implement offers, polls, catalogs, transactions or install applications. The content sources may be stored in memory 206 or be in storage 208 accessible by processor 204. The memory 206 is coupled to the bus 220 for communication with the other components. The instructions and/or data may include code for performing any and/or all of the techniques described herein. The memory 206 may be a dynamic random access memory (DRAM) device, a static random access memory (SRAM) device, flash memory or some other memory device.

The storage 208 may be a non-transitory memory that stores data. For example, the storage 208 may be a dynamic random access memory (DRAM) device, a static random access memory (SRAM) device, flash memory or some other memory device. In some implementations, the storage 208 also includes a non-volatile memory or similar permanent storage device and media, for example, a hard disk drive, a floppy disk drive, a compact disc read only memory (CD-ROM) device, a digital versatile disc read only memory (DVD-ROM) device, a digital versatile disc random access memories (DVD-RAM) device, a digital versatile disc rewritable (DVD-RW) device, a flash memory device, or some other non-volatile storage device. The storage 208 may store content sources in some implementations, and may be coupled for communication with the processor 204 and the social network application 109.

In some implementations, the social graph 210 may be a non-transitory memory that stores the social graph. In some examples, the social graph 210 can reflect a mapping of these users and how they are related. The phrase social graph as used herein encompasses its plain and ordinary meaning including, but not limited to, a file that includes the relationships between the users in a social network. For example, users can be friends, acquaintances, have business relationships, one user can follow another user, one user can subscribe to another user, etc.

The software communication mechanism 220 may be an object bus (e.g., CORBA), direct socket communication (e.g., TCP/IP sockets) among software modules, remote procedure calls, UDP broadcasts and receipts, HTTP connections, function or procedure calls, etc. Further, any or all of the communication could be secure (SSH, HTTPS, etc). The software communication mechanism 220 can be implemented on any underlying hardware, for example, a network, the Internet, a bus, a combination thereof, etc.

Figure 3:
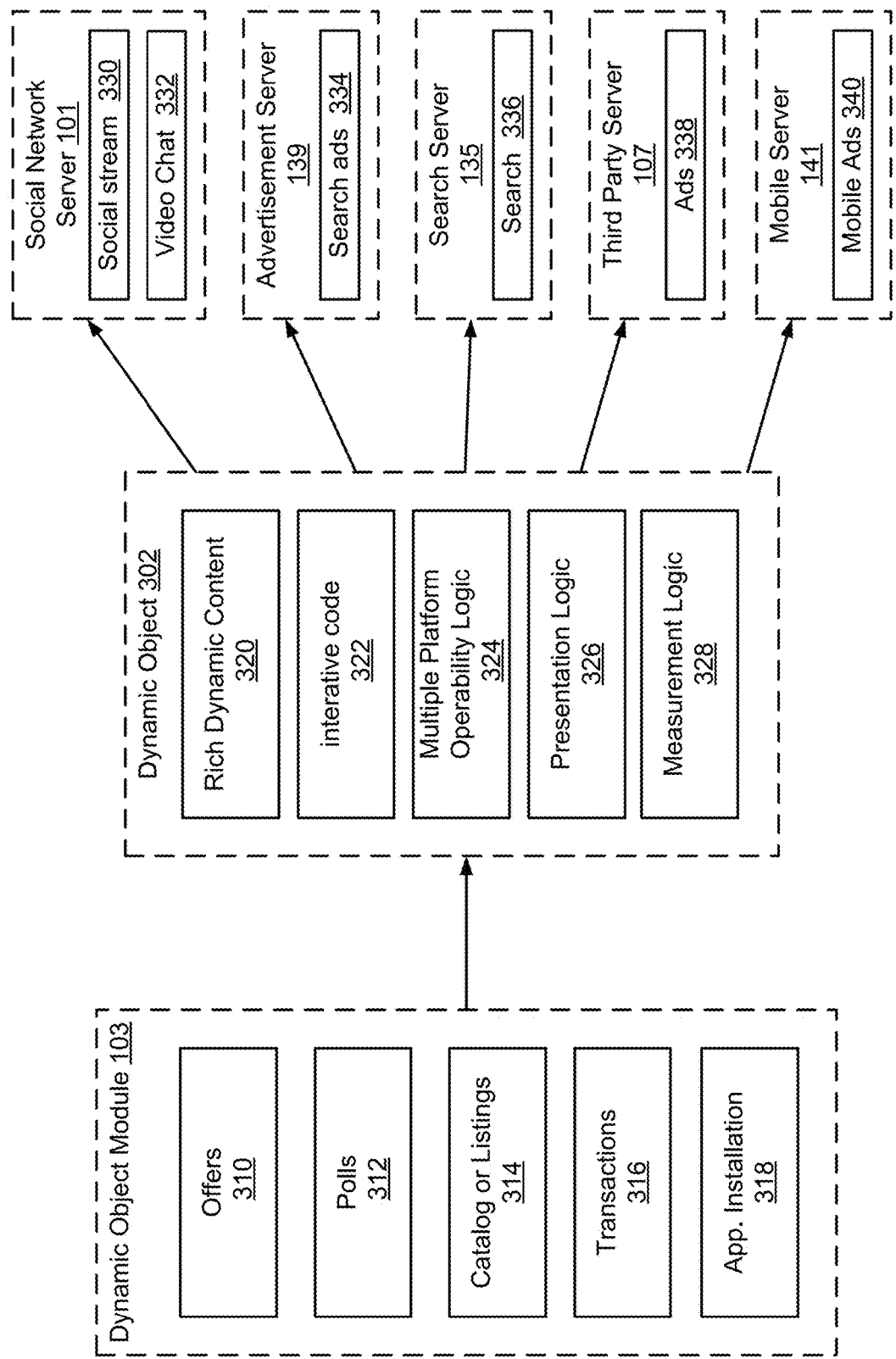
FIG. 3 is a block diagram illustrating an example dynamic object in relation to the dynamic object module and other components of the system.

FIG. 3 shows the dynamic object module 103, a dynamic object 302 and some of the components 101, 107, 135, 139 and 141 of the system 100 in more detail. FIG. 3 shows the relationship between the dynamic object 302 and the dynamic object module 103 and other components 101, 107, 135, 139 and 141 of the system 100. As shown, the dynamic object module 103 generates the dynamic object 302 and then it is sent for further processing by other components 101, 107, 135, 139 and 141 of the system 100.

The dynamic object module 103 generates the dynamic object 302 using one or more modules as will be described in more detail below with reference to FIG. 4. The dynamic object module 103 may include the capability to add functionality to the dynamic object 302. For example, dynamic object module 103 provides a platform that businesses and companies can use to manage their brand and generate dynamic objects 302 and sends them for use in other systems such as the social network, advertising, search or third-party publishing sites. Depending on the level of user engagement that the business or brand wants to establish, the dynamic object module 103 can be used to generate and send various different and diverse dynamic object 302 to perform particular functions that will increase user engagement with the brand or company. While the present disclosure will discuss the system 100 in the context of promotion of companies and brands, it should be understood that the system 100 and methods of the present disclosure are applicable also to user to user communication and interaction. Examples of different functionalities that may be included in a dynamic object 302 are illustrated as part of the dynamic object module 103. For example, functionality to implement an offer 310, a poll 412, a catalog or listing 314, a transaction 316 or an application installation 318 may be included as part of the dynamic object 302. The offer 310, Paul 312, catalog/listings 314, transaction 316 and application installation 318 are shown in FIG. 3 within the dynamic object module 103 as sample functionality that might be included in the dynamic object 302. It should be understood that other types of functionality although not shown in FIG. 3 may also be included within a dynamic object 302. The dynamic object module 103 generates the dynamic object 302 including the functionality described above. The dynamic object module 103 also includes functionality to add the other elements of the dynamic object 302 as are described below.

As shown in FIG. 3, the dynamic object 302 may include rich dynamic content 320, interactive code 322, multiple platform operability logic 324, presentation logic 326 and measurement logic 328.

The rich dynamic content 320 may be text, images, video, animation, etc. The rich dynamic content 320 may also be combinations of those data types. Rich dynamic content may be any content that provides additional information for example images, sound or video and thus invites or invokes the user to interact with the content. This is opposed to just text or other content that has limited appeal to the user. This is particularly advantageous because it allows the dynamic objects 302 to provide content that is highly attractive to users.

The interactive code 322 may be logic or code necessary to implement the functionality described above with regard to the dynamic object model 103. For example, the interactive code 322 may include the logic for a user to save the dynamic object 302, interact with the dynamic object 302, accept and use an offer, take and vote on a poll, review a catalog or listing, complete a transaction, or install an application. This is particularly advantageous because it allows dynamic objects 302 to be interactive and increase user engagement with a company or brand.

The multiple platform operability logic 324 includes code or routines that allow the rich dynamic content 320 and the interactive code 322 to operate on different platforms. For example, the dynamic object 302 includes the multiple platform operability logic 324 so that the same dynamic object 302 may be executed and processed by the social network server 101, the advertisement server 139, the search server 135, the third party server 107, the mobile server 141 or any other platform. The multiple platform operability logic 324 allows the rich dynamic content 320 to be presented and the interaction with the dynamic object 302 to be functionally the same regardless of the platform that is executing the dynamic object 302. Similarly, the multiple platform operability logic 324 also allows execution and processing of the dynamic object 302 by different types of client devices 115. For example, the dynamic object 302 may cooperate with and operate in part on a mobile phone, a portable tablet, or a desktop computer.

The presentation logic 326 is code or routines that allow the rich dynamic content 320 to be presented to the user. In particular, the presentation logic 326 modifies the rich dynamic content 320 and its format so that it can be presented on the platform where the dynamic object 302 is being executed. For example, as will be described below in conjunction with FIGS. 9A-10G, the presentation logic 326 controls how the rich dynamic content 320 is presented so that it is adapted or optimized for the manner in which it is being presented or displayed. This is particularly advantageous because it ensures that the rich content for presenting a company or brand is presented in the most positive and attractive manner.

Finally, the dynamic object 302 includes measurement logic 328 that allows the processing of the dynamic object 302 to be measured and reported. For example, the measurement logic 328 may record or send information about the use of the dynamic object 302, execution of the dynamic object 302, interaction with the dynamic object 302, etc. The measurement logic 328 may identify the platform upon which the dynamic object 302 is operable, the user device 115 that is interacting with the dynamic object 302, the users which are using, forwarding, sharing, posting, or commenting on the dynamic object 302, the users that consummated a transaction using the dynamic object 302, etc. This is particularly advantageous because it allows measurement of use, proliferation, and revenue generation of the dynamic object 302 independent of platform or user and based upon dynamic object 302 identity. Furthermore, the dynamic object structure 302 described above allows real-time analytics to generate statistics about usage of the dynamic object 302 in terms of interactions with the object, platforms in which the object is utilized, specific positions in which the dynamic object 302 is interacted, etc.

Once created by the dynamic object module 103, the dynamic object 302 is sent to one or more of the components 101, 107, 135, 139 and 141 of the system 100. Advantageously, the same dynamic object 302 may be sent to different components 101, 107, 135, 139 and 141 of the system 100 and is operable on each of those respective components 101, 107, 135, 139 and 141. For example, if the dynamic object 302 includes a poll to be taken, the dynamic object 302 can be sent to the social network server 101 and be presented as part of the stream of content 330 in the social network. The dynamic object 302 may operate on the social network server 101 and may present the poll as one item of content in the stream content 330. The dynamic object 302 may also be used to present the poll as part of a video chat 332. Similarly, the dynamic object 302 may be sent to the advertisement server or network 139 and will be included in web pages as a search ad 334. The search ad 334 will present the poll and allow the users to vote in the context of a webpage in which the search ad 334 is served. Similarly, the dynamic object 302 may be sent to the search server 135 and provided along with search results 336. If the dynamic object 302 is selected, the user can take the poll in the context of search results being presented. Likewise, the dynamic object 302 may be sent to a third party server 107 as an ad 338. The user may interact with the third party server 107 and once the ad 338 is selected, the poll will be presented. Finally, the dynamic object 302 may be sent to the mobile server 141 to be presented as a mobile ad 340 on a smart phone. The user may then take the poll using the smart phone. While FIG. 3 illustrates a single dynamic object 302 been sent and executed by multiple components 101, 107, 135, 139 and 141, it should be understood that the dynamic object 302 may only be sent to a single component 101, 107, 135, 139 and 141. It should also be understood that in the context of the social network, the dynamic object 302 may be shared, forwarded, passed on to other users within the social network on other platforms and the dynamic object 302 may be executed by those users with the same functionality as the original user.

Figure 4:
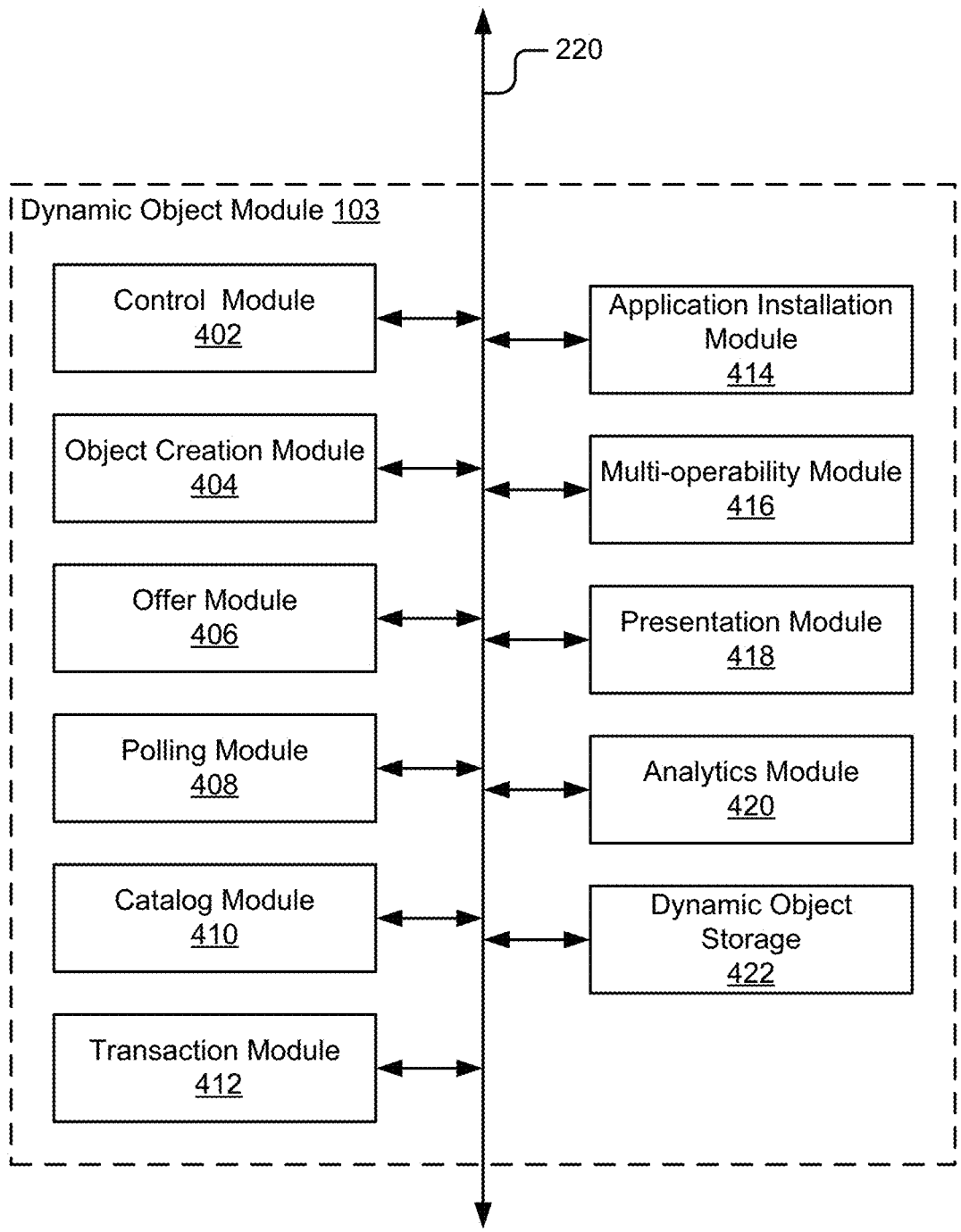
FIG. 4 is a block diagram illustrating an example dynamic object module.

FIG. 4 is a block diagram illustrating an example dynamic object module 103 in more detail. The dynamic object module 103 may include a control module 402, an object creation module 404, an offer module 406, a polling module 408, a catalog module 410, a transaction module 412, an application installation module 414, a multi-operability module 416, a presentation module 418, an analytics module 420 and dynamic objects storage 422. Each of these components 402, 404, 406, 408, 410, 412, 414, 416, 418, 420 and 422 may be coupled to the software communication mechanism 220 for communication with each other and the other components of the social network server 101.

The control module 402 may be software or routines for controlling the operation of the dynamic object model 103. The control module 402 is coupled to the bus 220 to communicate, control and interact with the other components of the dynamic object module 103. The operation of the control module 402 is described generally below with reference to FIG. 5. The control module 402 receives input from the user and may control the creation of dynamic objects 302, the transmission of dynamic objects 302, the cooperation with other system components 101, 107, 135, 139 and 141, and the analysis of use of dynamic objects 302. For example, the control module 402 cooperates with the object creation module 404 and the dynamic object storage 422 to create new dynamic objects 302. The control module 402 is also coupled to send created dynamic objects 302 to the other system components 101, 107, 135, 139 and 141 for use. For example, the control module 402 sends dynamic objects 302 to the social network application 109 so that the dynamic objects 302 may be posted to the social network. Likewise, the control module 402 may cooperate with the other system components 101, 107, 135, 139 and 141 to promote use of dynamic objects 302. The control module 402 may cooperate with the other system components 101, 107, 135, 139 and 141 to receive usage information about dynamic objects 302. This information is passed to the analytics module 424 storage and analysis as will be described below.

The object creation module 404 may be software or routines for creation of new dynamic objects 302. The object creation module 404 is coupled to the bus 220 for cooperation and interaction with the other components 402, 406, 408, 410, 412, 414, 416, 418, 420 and 422 of the direct object module 103. The operation of the object creation module 404 is described in more detail below with reference to FIG. 6. The object creation module 404 generates a workbench with which users may interact to create dynamic objects 302. In some implementations, the workbench allows companies or brands to manage and measure the creation and use of dynamic objects 302. The object creation module 404 generates and assembles the requisite components of a dynamic object 302 including the rich dynamic content 320, the interactive code 322, the multiple platform operability logic 324, the presentation logic 326 and the measurement logic 328. In some implementations, the object creation module 404 assigns each dynamic object a unique identification number so that the usage, proliferation path, and other statistics regarding the dynamic object 302 may be measured and analyzed. In some implementations, the object creation module 404 may create a file or container for the elements of the dynamic object 302. The object creation module 404 may retrieve the rich dynamic content 320 from the user or from the dynamic object storage 422 and associate it with the dynamic object 302. The object creation module 404 determines based on user input what functionality to include as part of the dynamic object 302. Based on the user input, the object creation module 404 cooperates with the offer module 406, the polling module 408, the catalog module 410, the transaction module 412, or the application installation module 416 to generate the input functionality and store it in the dynamic object 302 as the interactive code 322. The object creation module 404 also cooperates with the multi-operability module 416 to generate the multiple platform operability logic 324 that will allow interactive code 322 to be operable on different platforms. The multiple platform operability logic 324 is generated by the multi-operability module 416 and added to the dynamic object 302. The object creation module 404 may also cooperate with the presentation module 418 for two reasons: first, to generate the workbench to interact with the user, and second, to generate the presentation logic 324 that will be added to the dynamic object 302. The object creation module 404 may also cooperate with the analytics module 420 to generate the measurement logic 328 for the dynamic object 302. For example, the object creation module 404 may provide the analytics module 420 with the unique ID of the dynamic object 302 so that when data is received by the dynamic object module 103 subsequent to transmission of the dynamic object 302, the return status and use of the dynamic object 302 can be associated with that dynamic object 302. The object creation module 404 may also stores information in the dynamic object storage 422 as necessary for the creation of the dynamic object 302.

The offer module 406 may be software or routines for generating routines, code or logic for generating and presenting an offer. The offer module 406 is coupled to the bus 220 for cooperation and interaction with the other components 402, 404, 406, 408, 410, 412, 414, 416, 418, 420 and 422 of the dynamic object module 103. The offer module 406 generates interactive code 322 for generating and presenting an offer to a user. For example, the offer module 406 will identify the sources for the offer, details of the offer terms of the offer and how to utilize the offer. The offer module 406 sends the interactive code 322 including the offer functionality to object creation module 404 once created. The operation of the offer module 406 can be better understood with reference to FIGS. 8 and 9A-9I below.

The polling module 408 may be software or routines for generating routines, code or logic for conducting a poll. The polling module 408 is coupled to the bus 220 for cooperation and interaction with the other components 402, 404, 406, 410, 412, 414, 416, 418, 420 and 422 of the dynamic object module 103. The polling module 408 generates interactive code 322 for conducting a poll and displaying poll results. For example, the polling module 408 will specify the text and images for use in the poll, a location for storage of the poll results, a location to be updated as votes are cast, and other information necessary for the interactive code. The polling module 408 sends the interactive code 322 including the polling functionality to object creation module 404 once created. The operation of the polling module 408 can be better understood with reference to FIGS. 8 and 10A-10G below.

The catalog module 410 may be software or routines for generating routines, code or logic for generating and presenting a catalog or listing. The catalog module 410 is coupled to the bus 220 for cooperation and interaction with the other components 402, 404, 406, 408, 412, 414, 416, 418, 420 and 422 of the dynamic object module 103. The catalog module 410 generates interactive code 322 for presenting and interacting with a catalog or listing. For example, the catalog module 410 will specify the sources for text and images for the catalog, functionality built into the catalog, interfaces for viewing data that is part of the catalog etc. The catalog module 410 sends the interactive code 322 including the catalog or listing functionality to object creation module 404 once created. The operation of the catalog module 410 can be better understood with reference to FIGS. 8 and 11A-11C below.

The transaction module 412 may be software or routines for generating routines, code or logic for completing a transaction. The transaction module 412 is coupled to the bus 220 for cooperation and interaction with the other components 402, 404, 406, 408, 410, 414, 416, 418, 420 and 422 of the dynamic object module 103. The transaction module 412 generates interactive code 322 for completing a transaction. For example, the transaction module 412 will specify the vendor, payment processing agencies, price, order status, additional fees, etc. The transaction module 412 sends the interactive code 322 including the transaction logic to the object creation module 404 once created. The operation of the transaction module 412 can be better understood with reference to FIGS. 8 and 12A-12 C below.

The application installation module 414 may be software or routines for routines, code or logic for installing the software application. The application installation module 414 is coupled to the bus 220 for cooperation and interaction with the other components 402, 404, 406, 408, 410, 412, 416, 418, 420 and 422 of the dynamic object module 103. The application installation module 414 generates interactive code 322 for installing the software application. For example, the application installation module 414 identifies the application, identifies the operational platform, includes routines for installing the application, copies the application code and creates the interactive code 322 for installing and sending the application. The application installation module 414 sends the interactive code 322 including the application installation logic to the object creation module 404 once created. The operation of the application installation module 414 can be better understood with reference to FIGS. 8 and 13A-13 C below.

The multi-operability module 416 may be software or routines for producing the multiple platform operability logic 324 and sending it to the object creation module 404 for addition to the dynamic object 302. The multi-operability module 416 is coupled to the bus 220 for cooperation and interaction with the other components 402, 404, 406, 408, 410, 412, 414, 418, 420 and 422 of the dynamic object module 103. The multi-operability module 416 produces and adds code or routines that allow the rich dynamic content 320 and the interactive code 322 to operate on different platforms.

The presentation module 418 can be software or routines for providing the workbench interface or other user interfaces for creating dynamic objects 302, monitoring proliferation of the dynamic objects 302 in the social network and presenting analytics information related to use and interaction of dynamic objects 302. The presentation module 418 may also be software and routines for generating the presentation logic 326 and sending the presentation logic 326 to the object creation module 404 for insertion in the dynamic object 302. The presentation module 418 is coupled to the bus 220 for cooperation and interaction with the other components 402, 404, 406, 408, 410, 412, 414, 416, 420 and 422 of the dynamic object module 103.

The analytics module 420 may be software or routines for generating the measurement logic 328 and sending the measurement logic 328 to the object creation module 404 for insertion in the dynamic object 302. The analytics module 420 may also be software or routines for monitoring proliferation of the dynamic objects 302 in the social network and providing analytics information related to use and interaction with dynamic objects 302. For example, the analytics module 420 may aggregate statistics about usage interaction related to a particular dynamic object 302. The analytics module 420 provides the ability to track different instances of the same dynamic object 302 throughout the social network, analyze how it spreads and how people engage with it. The analytics module 420 may provide information that the creator of the dynamic object 302 (e.g., that includes a poll, an offer, a video, etc.) can use to learn how that content spreads virally throughout the social network, even if people independently discovered and shared the dynamic object 302 from its original source. The analytics module 420 may also be used to correlate an action taken with regard to the dynamic object 302 to the position of the dynamic object in the stream of content or state in social media, position on the webpage, position in the search results, etc. Furthermore, the analytics module 420 can be used to determine what dynamic objects 302 result in driving more leads, conversations and engagement. The analytics module 420 is particularly advantageous because it allows measurement of a various statistics by dynamic objects 302 instead of by post or comment. Furthermore, the analytics module 420 is able to correlate a dynamic object 302 to completed sales, engagement, use position, path of movement of the dynamic object 302 across the network, as well as other inferences such as which users are influencers. The analytics module 420 is coupled to the bus 220 for cooperation and interaction with the other components 402, 404, 406, 408, 410, 412, 414, 416, 418 and 422 of the dynamic object module 103.

The dynamic object storage 422 may be a data store for storing information used by the other components 402, 404, 406, 408, 410, 412, 414, 416, 418 and 422 of the dynamic object module 103. For example, the dynamic object storage 422 may store rich content, templates for dynamic objects, or routines, code or logic utilized for creation of interactive code 322, multiple platform operability logic 324, presentation logic 326, or measurement logic 328. The dynamic object storage 422 may also store analytics information gathered from dynamic objects 302. The dynamic object storage 422 is coupled to the bus 220 for cooperation and interaction with the other components 402, 404, 406, 408, 410, 412, 414, 416, and 418 of the dynamic object module 103.

Figure 5:
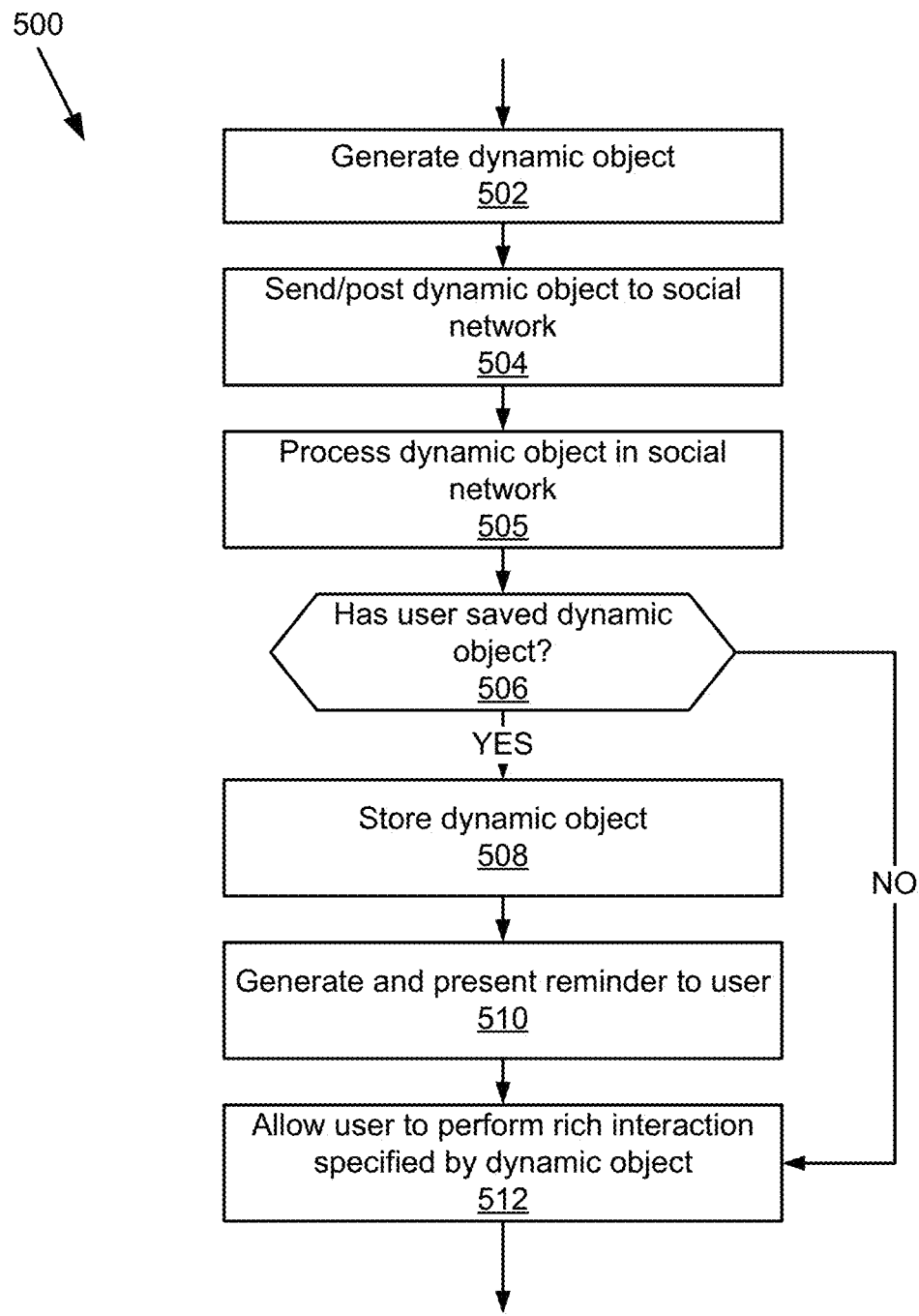
FIG. 5 is a flow chart illustrating an example method for processing rich, dynamic interactive objects.

FIG. 5 is a flow chart illustrating an example method 500 for processing rich, dynamic interactive objects. The method 500 begins by generating 502 a dynamic object 302. This process is described below in more detail with reference to FIG. 6. For example, a merchant may create a dynamic object 302 that the merchant includes an offer. Then the method 500 sends or posts 504 the dynamic object 302 to the social network. A particular company may have a presence on a social network and a number of users who are interested in that company on the social network. The company may use the system 100 to post a dynamic object 302 for the users who have expressed interest in the company. While the method will now be described in the context of dynamic objects 302 in a social network, it should be understood that the dynamic object 302 could just as well be sent into an advertising network 139 or provided along with search results by a search server 135. The social network application 109 will process 505 the dynamic object 302 and make the dynamic object 302 available as a post for viewing by those users. For example, the offer may be posted to the social network. Through normal use in a social network, the offer may be forwarded to others, re-shared, commented upon, or endorsed by others. This may cause the offer to spread virally through the social network. As the offer is presented to the user, the user may be presented with the option of saving the offer of dynamic object 302. The method 500 continues by determining 506 whether the user has saved the dynamic object 302. In order to increase the efficacy of the dynamic object 302, the user may either immediately interact with the dynamic object 302 or save the dynamic object 302 and interact with it some later time. If the user has chosen to interact with the dynamic object, the method 500 proceeds from block 506 to block 512 as will be described below. On the other hand, if the user has decided to save the dynamic object 302, the method 500 continues to store 508 the dynamic object 302. The stored dynamic object 302 can be used and interacted with at a later time by the user. In some implementations, the dynamic object 302 also includes triggers that will cause the saved dynamic object to be re-presented to the user. The method 500 continues by generating and presenting 510 one or more reminders to the user to interact with the dynamic object 302. The process for triggering reminders will be described in more detail below with reference to FIG. 7. The triggers may be based on the lapse of time, location of the user, activity of the user, the user making contact with a particular user or group of other users, the user viewing a post on the same topic, the user is viewing a post by a competitive company, or various other activities performed by the user or changes of state in the social network. For example, a reminder may be generated by the dynamic object 302 if the offer is about to expire or the user is near the store to which the offer pertains. At some point, the user is allowed to interact 512 with the dynamic object 302. This can be directly when the dynamic object 302 is presented, in response to a reminder, or merely because the user later becomes interested in the dynamic object 302. The user can be allowed to perform 512 rich interaction specified by the dynamic object 302. This process is described in more detail below with reference to FIG. 8.

Figure 6:
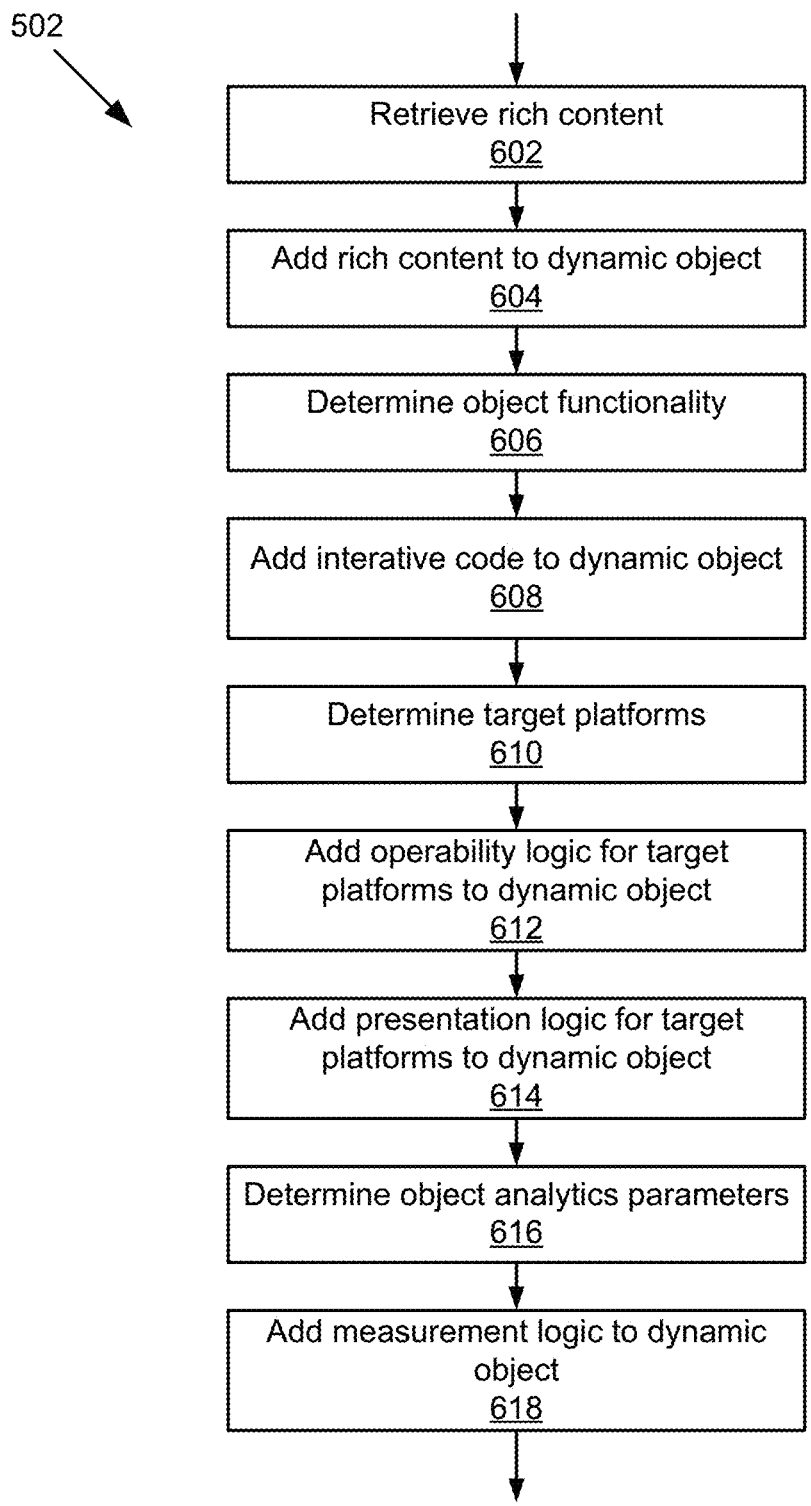
FIG. 6 is a flow chart illustrating an example method for generating a dynamic object.

FIG. 6 is a flow chart illustrating an example method 502 for generating a dynamic object 302 in more detail. The method 502 begins by retrieving 602 rich content and adding 604 it to the dynamic object 302. Examples of rich content have been described above with reference to the rich dynamic content 320 of FIG. 3. The method 502 continues by determining 606 the functionality that will be included in the dynamic object 302. For example, based on user input the dynamic object 302 may implement an offer, a poll, a catalog, a transaction or the installation of application. Based on the type of object the user wants to create, the functionality is determined and then the corresponding interactive code 322 is added 608 to the dynamic object 302. For example, if a poll 312 is the functionality to be added to the dynamic object 302, the object creation module 404 interacts with the polling module 408 to create the code or routines necessary for a poll. More particularly, this may require routines in code for presentation of the voting options, content to present the voting options, the gathering of votes and the presentation of results. The method 502 continues by determining 610 one or more target platforms. Based upon the one or more platforms determined in block 610, the method 502 adds 612 the multiple platform operability logic 324 for the target platforms to the dynamic object 302. Next, the method 502 adds 614 the presentation logic 326 for the target platforms to the dynamic object 302. Then the method 502 determines 616 the analytics parameters to be measured for the dynamic object 302. For example, particular parameters such as whether a transaction was completed or the platform and location at which the dynamic object was interacted with the user can be measured. The creation of the dynamic object 302 completes by adding 618 measurement logic 328 corresponding to the analytics parameters determined in block 616.

Figure 7:
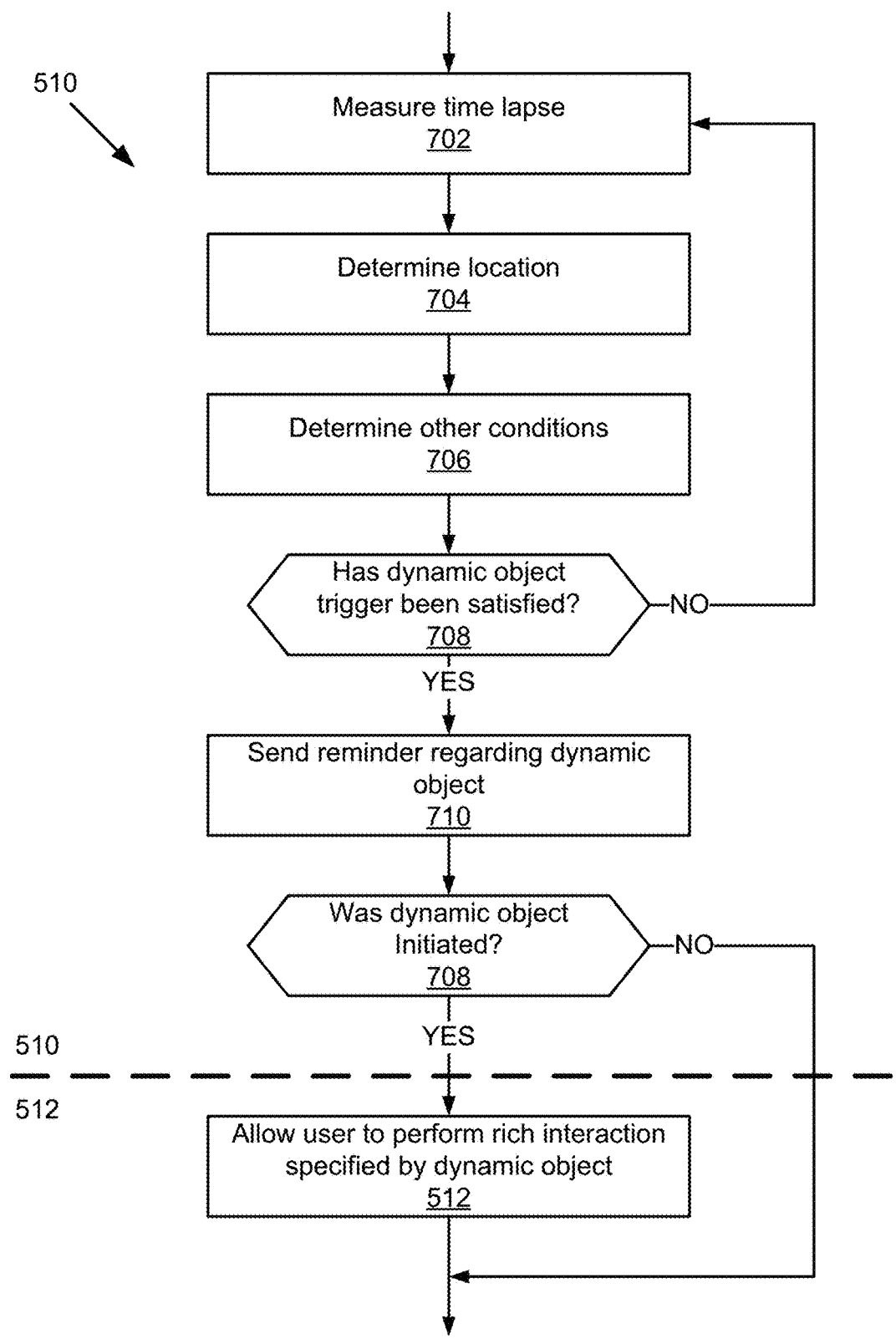
FIG. 7 is a flow chart illustrating an example method for triggering use of a dynamic object.

FIG. 7 is a flow chart illustrating an example method 510 for triggering use of a dynamic object 302. The method 510 begins by measuring 702 how much time has elapsed. Then the method 510 determines 704 the location of the dynamic object 302. Next the method 510 determines 706 the state of any other conditions that have been set as triggers. The method 510 next determines 708 whether any of the triggers associated with the dynamic object 302 has been satisfied. If not, the method 510 loops back to block 702 to repeat the testing steps at 702, 704 and 706. On the other hand, if anyone of the dynamic triggers has been satisfied in block 708, the method 510 sends 710 a reminder to the user regarding the dynamic object 302. In some embodiments, the dynamic object 302 displays other content related to the reminder as part of the presentation of the dynamic object 302. Next the method 510 determines 708 whether the dynamic object 302 was initiated. If so, the method proceeds to step block 512. If not, the method 510 completes without any interaction between the user and the dynamic object. In some embodiments, the method 510 proceeds to block 702 from block 708 if the object was not initiated.

Figure 8:
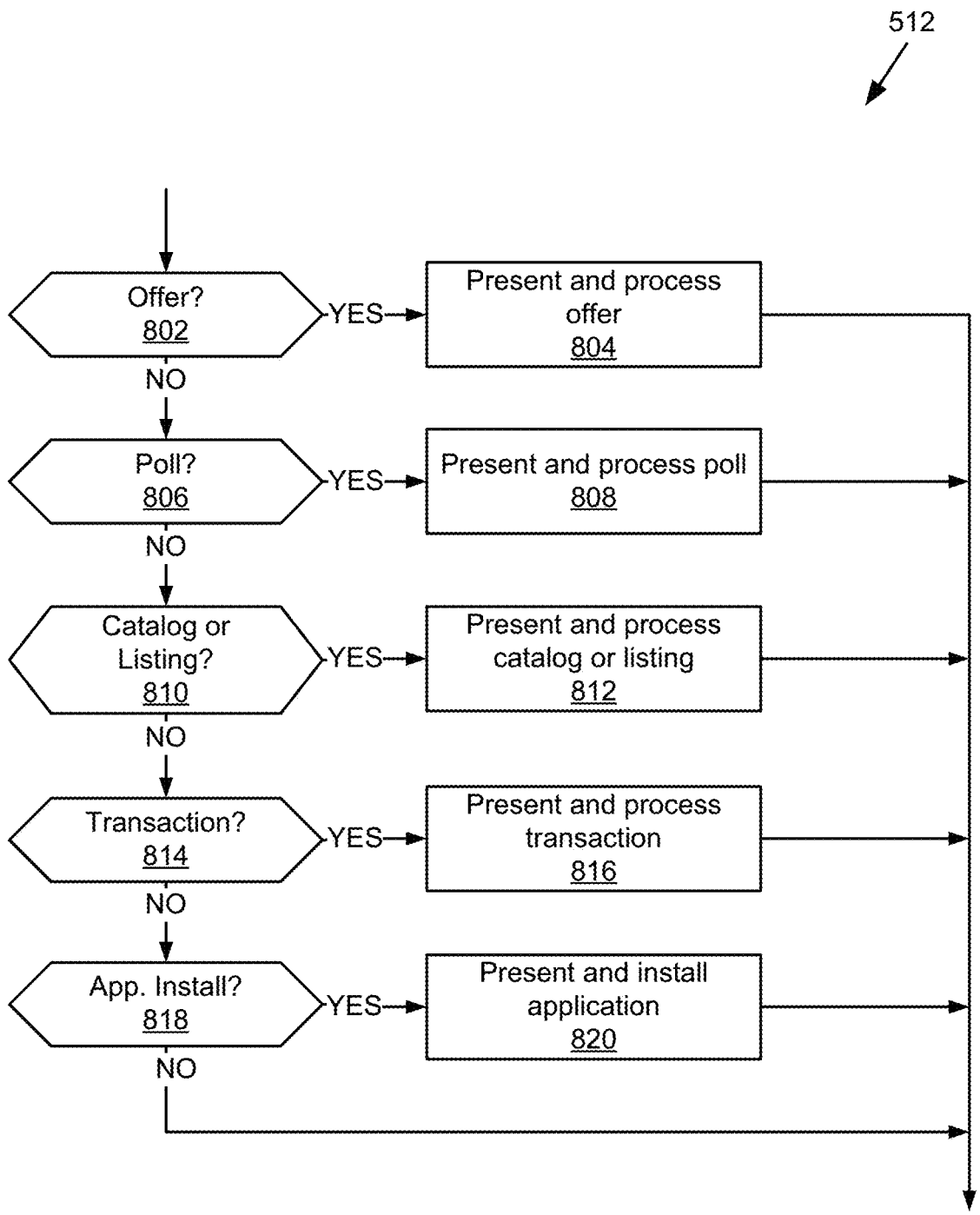
FIG. 8 is a flow chart illustrating an example method for processing a dynamic object.

FIG. 8 is a flow chart illustrating an example method 512 for processing a dynamic object 302. In each of the presentation processing steps described below, the routines of the dynamic object 302 are executed by a combination of the corresponding platform on which the dynamic object 302 is being served and the client device 115. It should be understood that the execution of the routines of the dynamic object 302 could be performed by the platform alone or the client device 115 alone in other implementations. The method 512 begins by determining 802 whether the interactive code 322 of the dynamic object 302 is an offer. If so, the method 512 presents and processes 804 the interactive code 322 which will generate interfaces to present an offer to the user and allow the user to interact with the offer. Example interfaces for presenting an offer are shown and described below with reference to FIGS. 9A-9I.

If not, the method 512 determines 806 whether the interactive code 322 for the dynamic object 302 is a poll. If so the method 512 presents and processes 808 the interactive code 322 which will generate interfaces to take a poll and allow the user to interact with the poll. Example interfaces for conducting and presenting poll results are shown and described below with reference to FIGS. 10A-10G.

If the interactive code 322 is not a poll, the method 512 proceeds to determine 810 whether the interactive code 322 is the presentation of a catalog or listing. If so, the method 512 presents and processes 812 the interactive code 322 and presents the catalog for interaction with the user. Example interfaces for presenting a catalog or listing are shown and described below with reference to FIGS. 11A-11C.

If the interactive code 322 is not the presentation of a catalog or listing, the method 512 proceeds to determine 814 whether the interactive code 322 is the completion of a transaction. If so, the method 512 presents and processes 816 the interactive code 322 to complete a transaction. Example interfaces for completing a transaction are shown and described below with reference to FIGS. 12A-12C.

If the interactive code 322 is not to perform a transaction, method 512 determining 818 whether the interactive code 322 is the installation of application. If so, the method 512 presents and installs 820 the application. If not, there is no interactive code 322 to present to the user. Example interfaces for installing an application are shown and described below with reference to FIGS. 13A-13C.

Figure 9A:
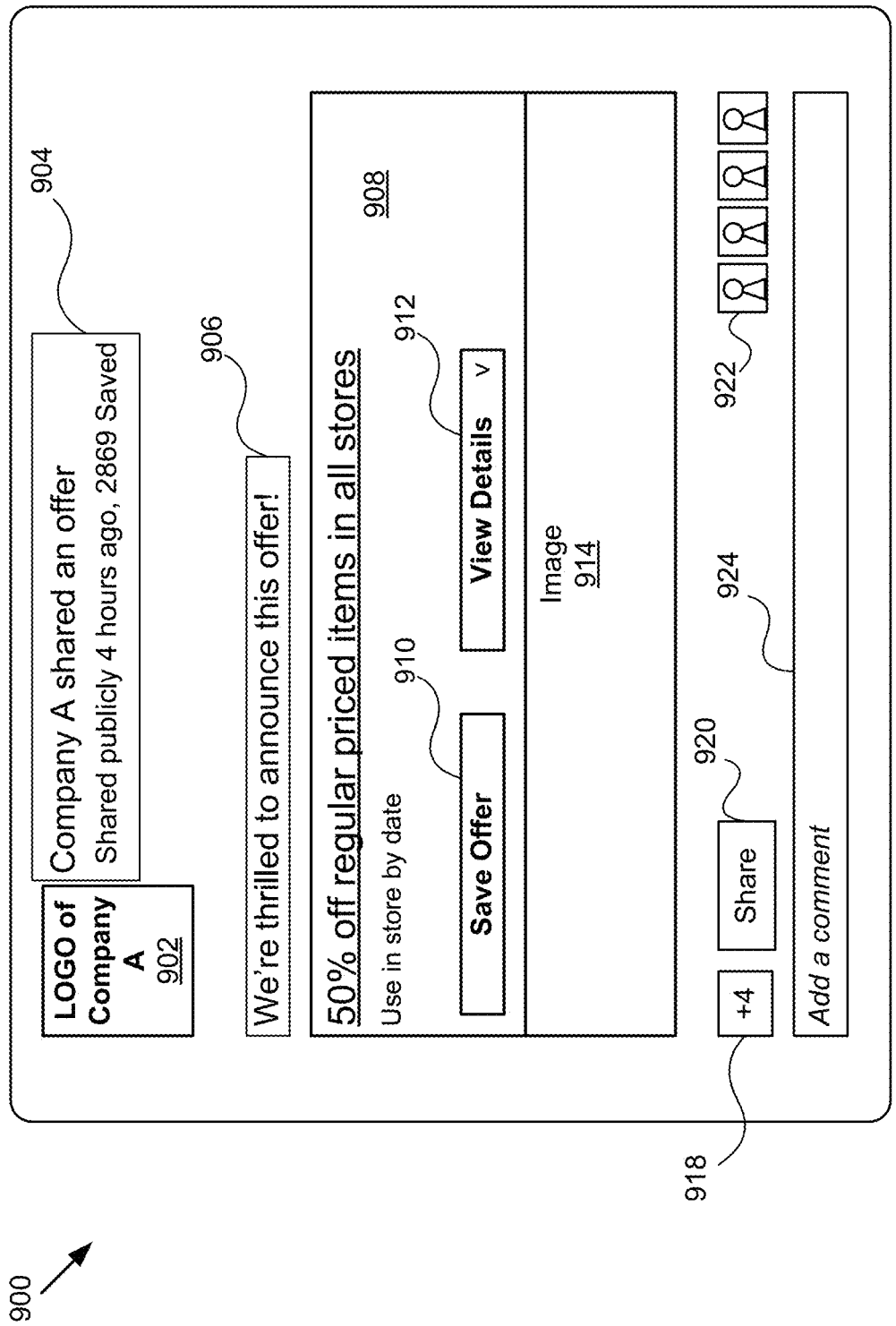
FIGS. 9A-9I are graphic representations of example user interfaces for processing an offer with a dynamic object.
Figure 9B:
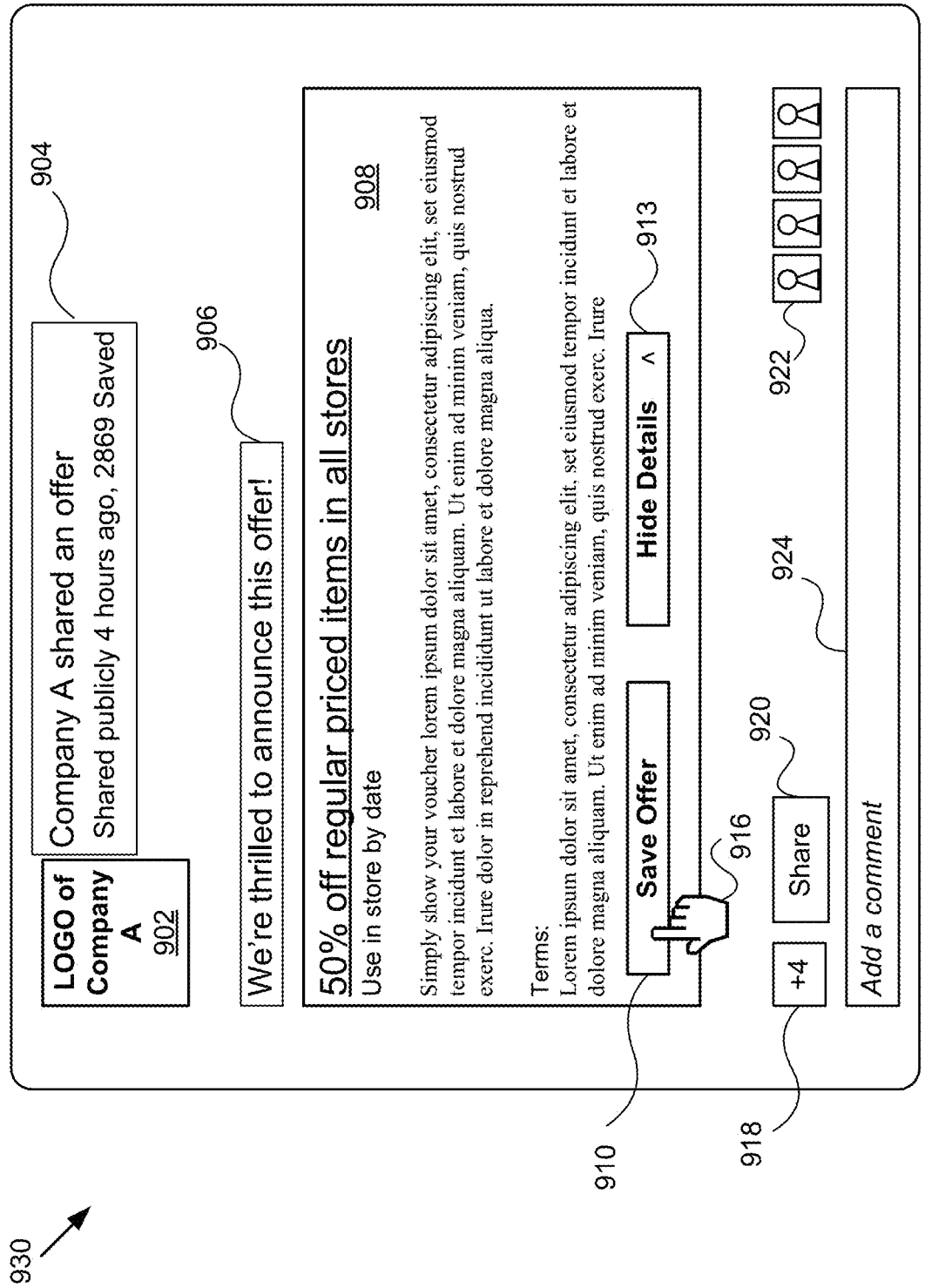
Figure 9C:
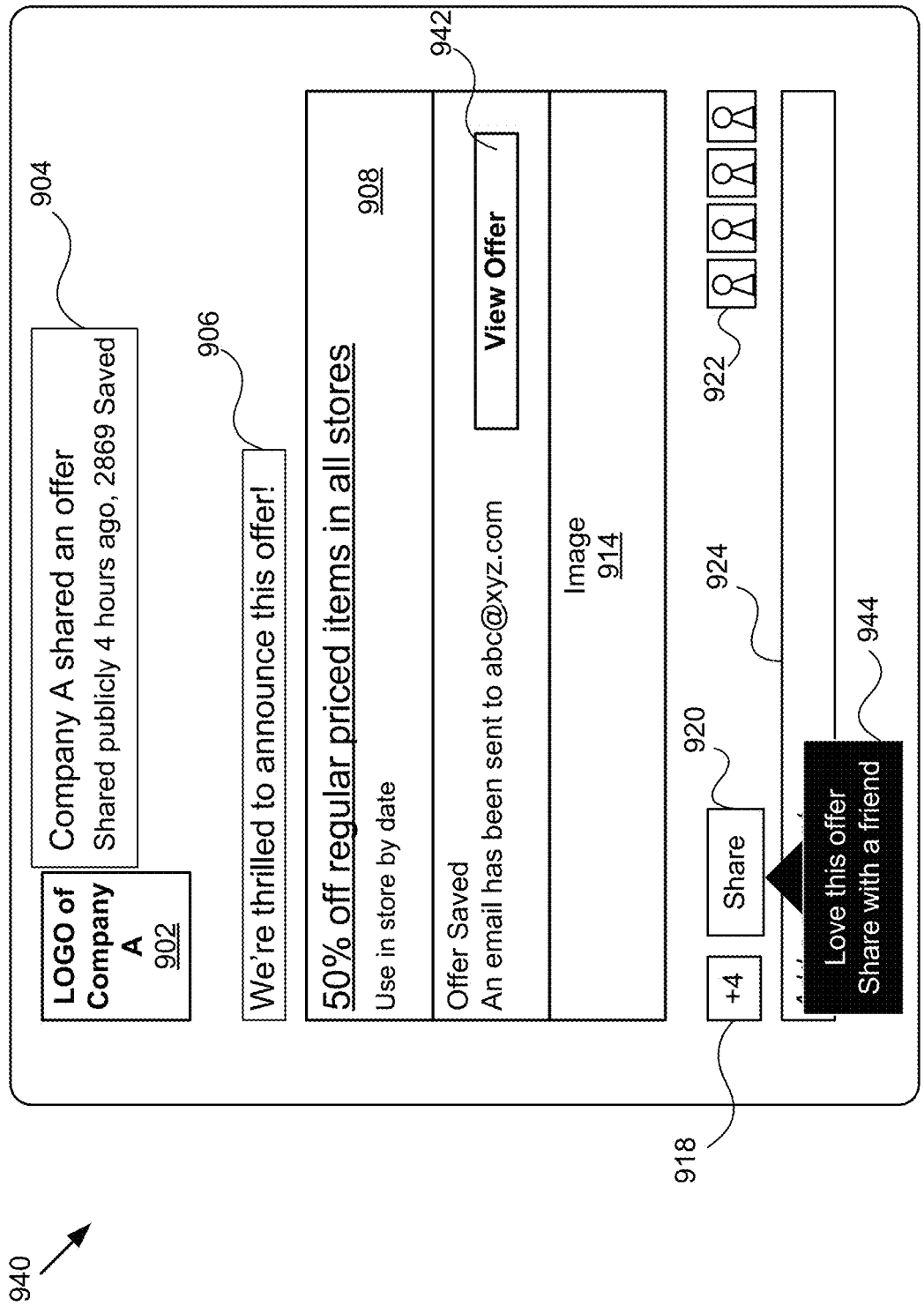

FIGS. 9A-9I are graphic representations of example user interfaces for processing an offer with a dynamic object 302. More specifically, FIGS. 9A-9C show example user interfaces for a desktop environment.

FIG. 9A is a graphic representation of an example user interface 900 generated by a dynamic object 302 for the presentation of an offer in a desktop environment. The interface 900 may include the logo 902 of the company, and information 904 identifying the company that share the offer, when the offer was shared and how many users saved the offer. The interface 900 may also include other information 906 about the offer. The interface 900 includes an offer area 908 represents a title of the offer and some information about the offer. The offer area 908 also includes a selectable button 910 for saving the offer and is selectable buttons 912 for viewing additional details about the offer. The offer area 908 may be provided with a background image 914 or an image area 914 adjacent to the offer area may be provided. Below the offer area 908 and the image area 914, the interface 900 provides an indicator 918 of the number of users that have endorsed the offer, a button 920 for sharing the offer, a plurality of thumbnails 922 of users that have commented on the offer. The thumbnails 922 are selectable by the user to display the comment corresponding to the user's thumbnail 922. Finally, a comment area 924 is provided for the user to interact with the offer and post a comment about the offer.

Referring now to FIG. 9B, if the user selects the view details button 912 in FIG. 9A, the interface 900 transitions to the interface 930 of FIG. 9B. This interface 930 has many similar elements 902, 904, 906, 910, 918, 920, 922 and 924 similar to the interface 900 of FIG. 9A. However, in the interface 930 of FIG. 9B, the offer area 908 is expanded over the image area 914 (in FIG. 9A) to provide additional information about the offer. For example, the terms and conditions of the offer may be provided. Additionally, the additional details button 912 is replaced by a hide details button 913. The interface 930 also includes a cursor 916 over the save offer button 910 indicating that the user is about to select the save offer button 910.

Referring now to FIG. 9C, if the user selects the save offer button 910 as suggested by the cursor 916 in FIG. 9B, the display transitions from the interface 930 of FIG. 9B to the interface 940 of FIG. 9C. Interface 940 includes many of the similar elements of the prior interfaces 900, 930; however, the offer area 908 is modified to indicate that the offer has been saved and an email has been sent to an email address. A button 942 is also provided that allows the user to view the offer. Interface 940 is also modified to show a drop down box 944 that is presented in response to selection of the share button 920. The drop down box 944 allows the user to add a comment and share the offer with a friend. Doing so will allow the recipient friend to view the offer using the interface 900 of FIG. 9A.

Figure 9D:
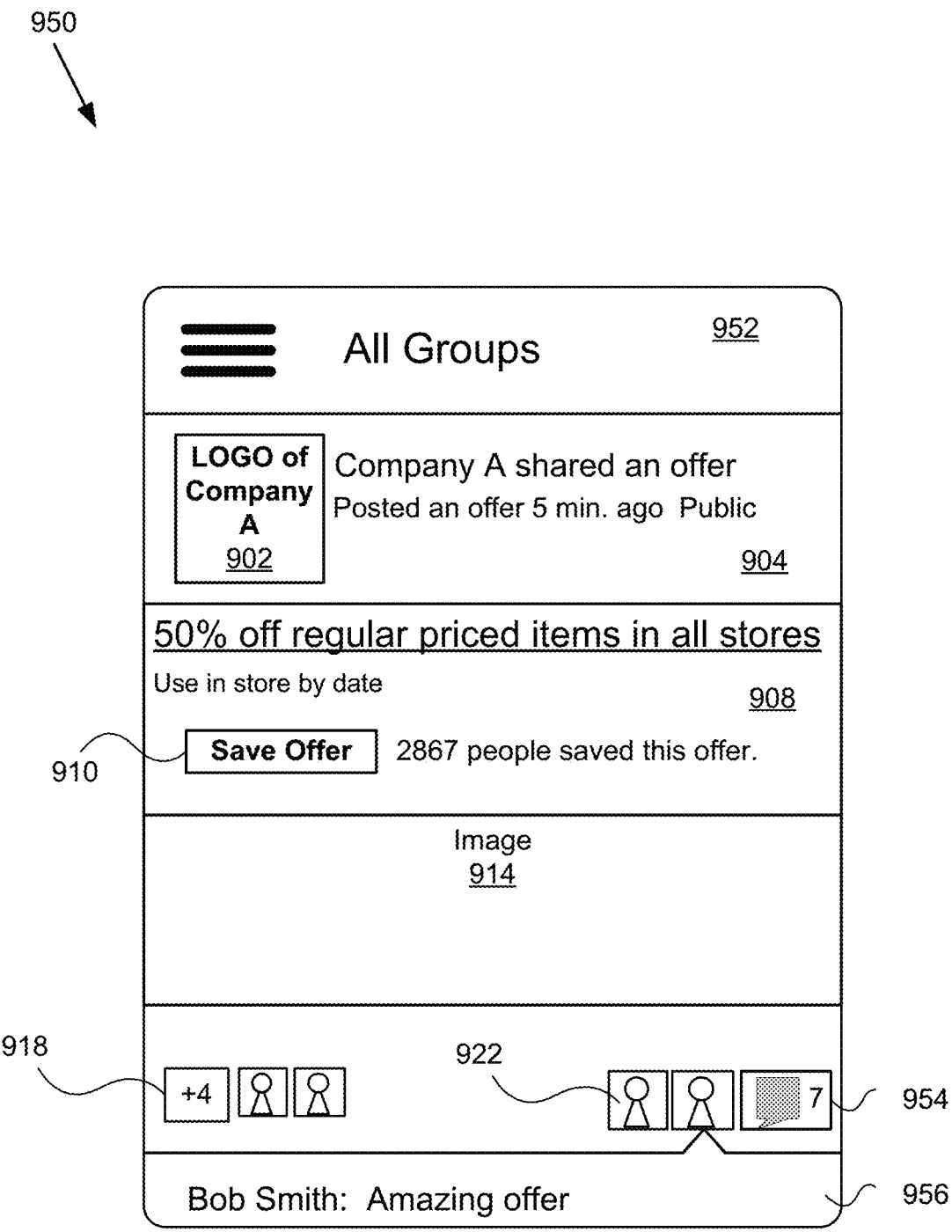

Referring now to FIGS. 9D-9I, example user interfaces for presenting an offer by a dynamic object 302 on a smart phone will be described. FIG. 9D illustrates an example interface 950 for a smart phone. In FIGS. 9D-9I, like reference numbers have been used to reference like parts with the same or similar functionality as those described above with reference to FIGS. 9A-9C. It should be understood that those components are modified in shape and size to be adapted for the screen size of a smart phone. The interface 950 also includes a header 952 indicating information about the group to which the offer pertains. The interface 950 also provides an indicator 954 as to the number of comments and a comment area 956 showing a specific comment made by another user.

Figure 9E:
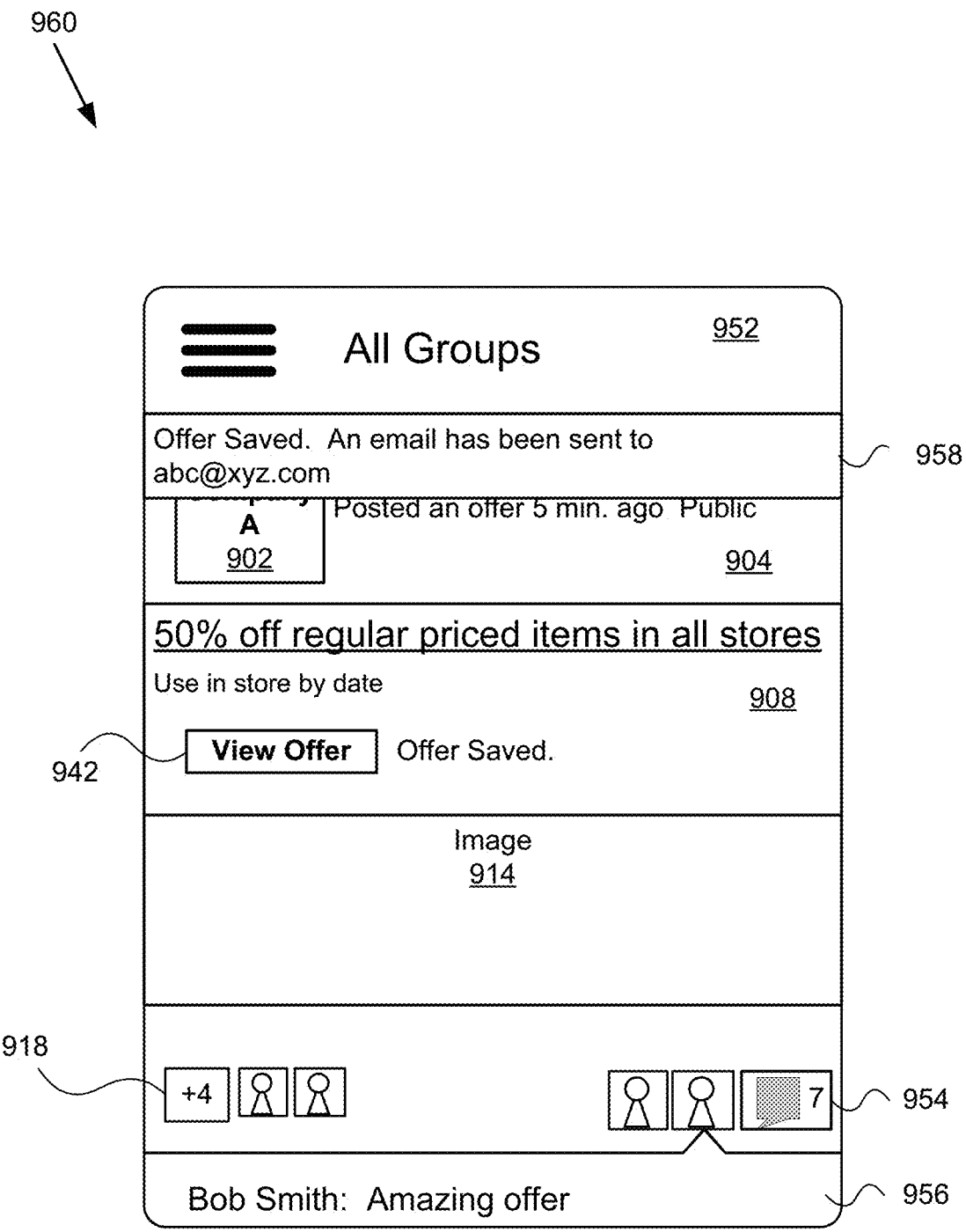

FIG. 9E shows the user interface 960 presented in response to a user selecting the save offer button 910 of the interface 950 of FIG. 9D. As can be seen, a new section 958 is presented over the interface 960 indicating that the offer has been saved and an email has been sent to an email address. Additionally, the save offer button 910 has been replaced by the view offer button 942. And a further indication is presented in the offer area 908 for the offer has been saved.

Figure 9F:
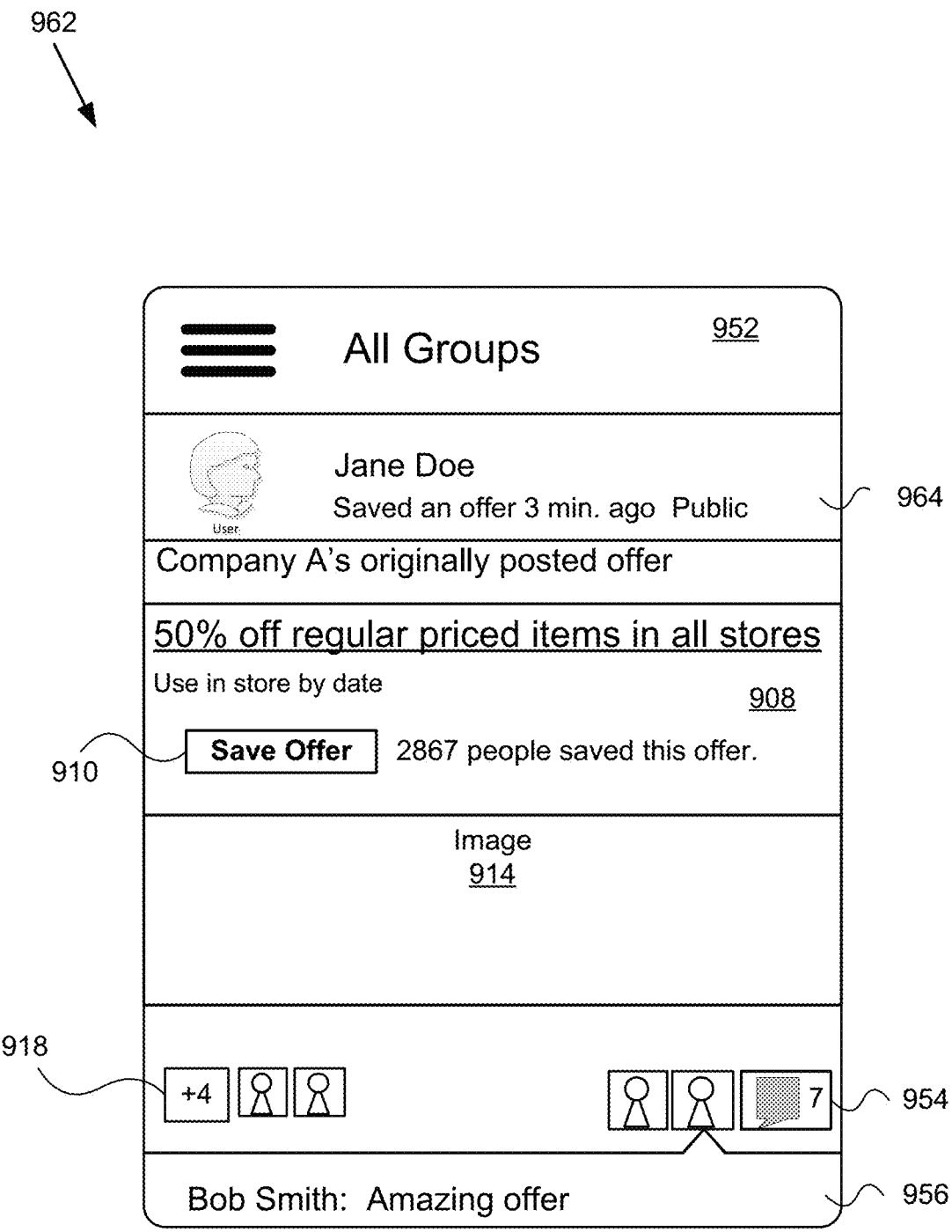

FIG. 9F shows an interface 962 presented to a recipient user to which the original offer of FIG. 9D was forwarded or a recipient user who is the friend of another user who saved the offer. In this example, the interface 962 adds an area 964 below the header 952 to indicate the other user who saved the offer and provide the user's image and a reason why the offer is being presented to the recipient user. The area 964 may also include an introductory phrase indicating that the offer area 908 contains company A's originally posted offer.

Figure 9G:
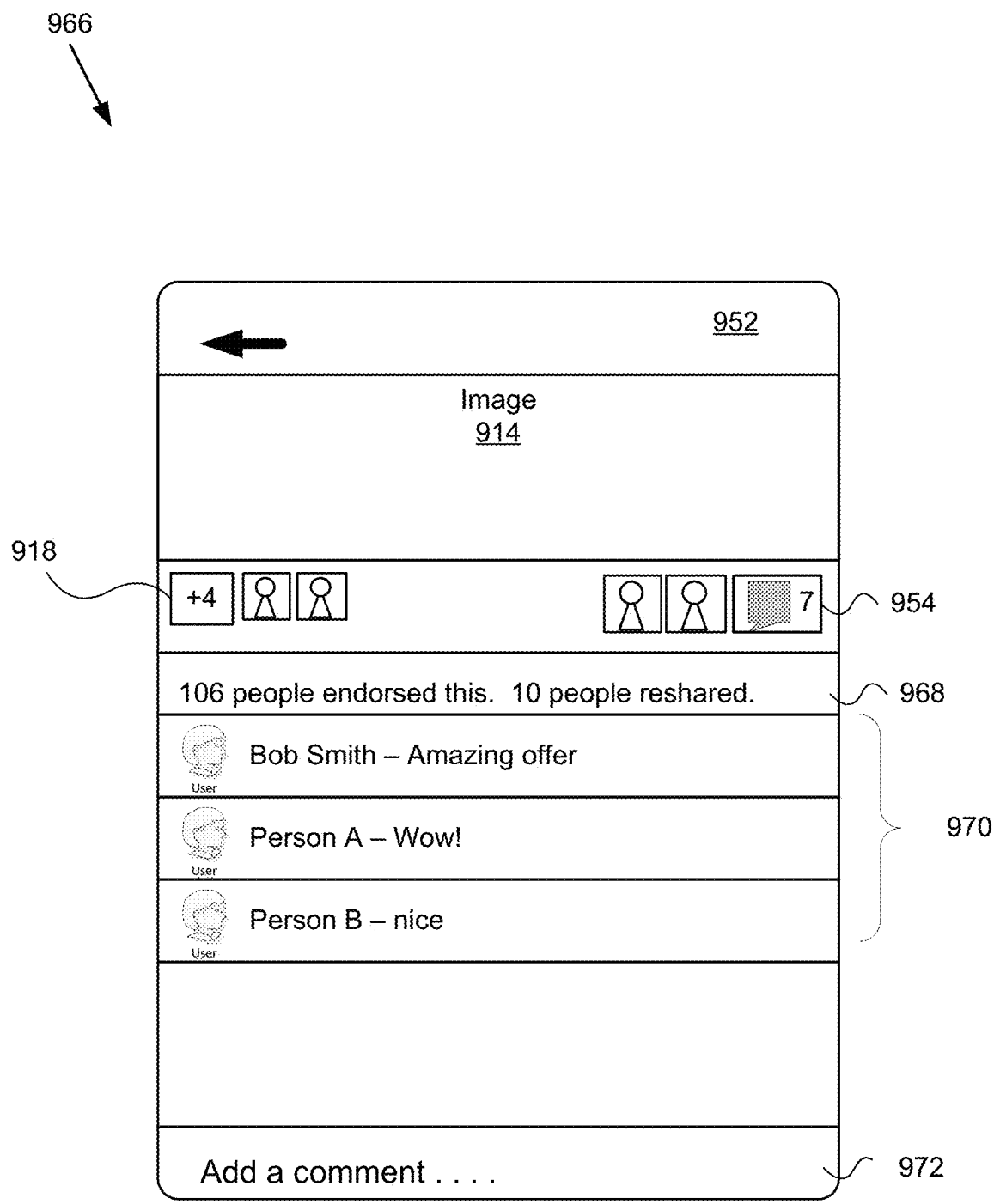

FIG. 9G shows an interface 966 presented to the user in response to selection of the indicator 954 of the interface 950 of FIG. 9D. This interface 966 removes the details of the offer but provides information 968 about the number of people that endorsed the offer and the number of people that re-shared the offer. An additional section 970 provides images and names and comments of other users about the offer. Finally, a bottom section 972 provides an area in which the user can add a comment about the offer.

Figure 9H:
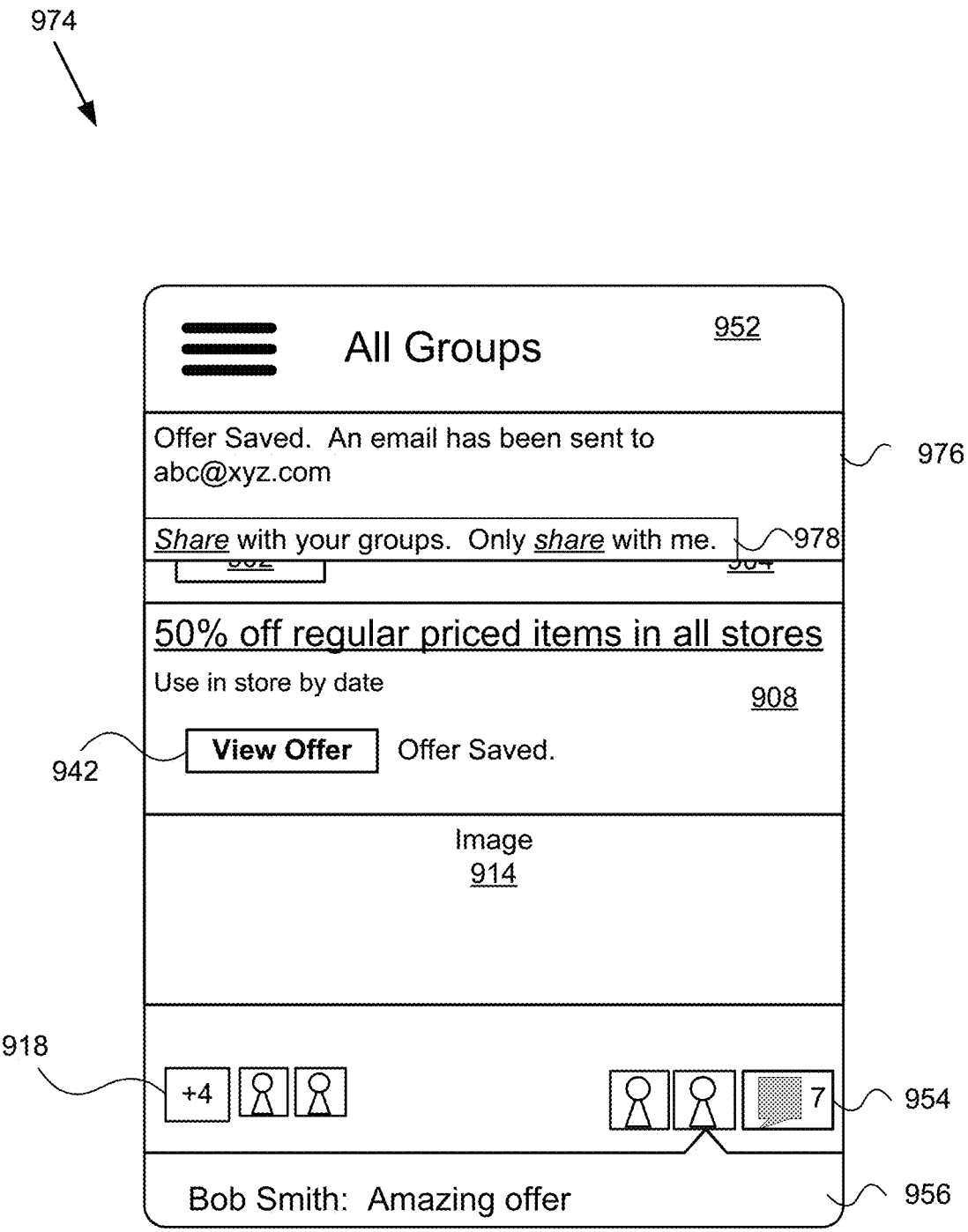

FIG. 9H shows an interface 974 presented to the user in response to saving of an offer such as using the interface 960 of FIG. 9E. In this example, the user may have enabled an auto share function. The auto share function provides similar information about the offer being saved in area 976 but also provides options 978 for sharing the offer. Either of these two options allows the user to select them and either share the offer with a group or share the offer only with the user own.

Figure 9I:
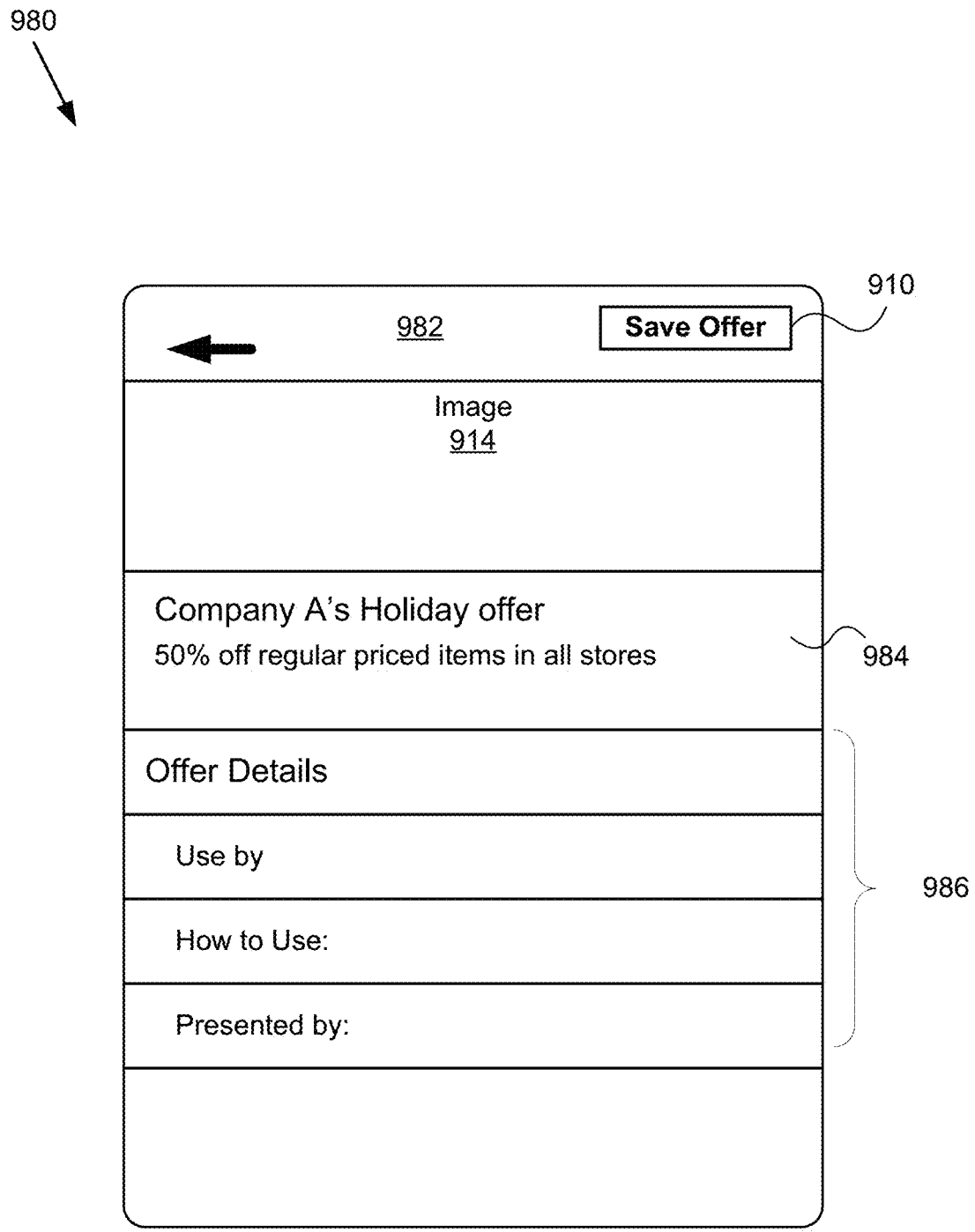

FIG. 9I shows an interface 984 presenting more details of the offer to the user. For example, the interface 984 of FIG. 9I may be presented in response to selection of the view offer button 942 of FIG. 9D or 9H. In interface 984, the header 982 is modified to provide a back button and a button 910 for saving the offer. A modified version of the offer is presented in an offer area 984. Below the offer area 984, several sections 986 are provided so that the offer details may be set forth including time conditions, used positions and who originally generated the offer.

The use of dynamic objects 302 to generate the offers described above with reference to FIGS. 9A-9I are particularly advantageous because the dynamic objects 302 allow companies to author offers, the interactive code 322 can be modularized to provide specific functionality for offers, the offers can be provided in multiple platforms using the single dynamic object 302, the presentation logic 326 allows very similar content to be presented on platforms with different display characteristics, and the measurement logic 328 allows or offers usage to be monitored and optimized.

Figure 10A:
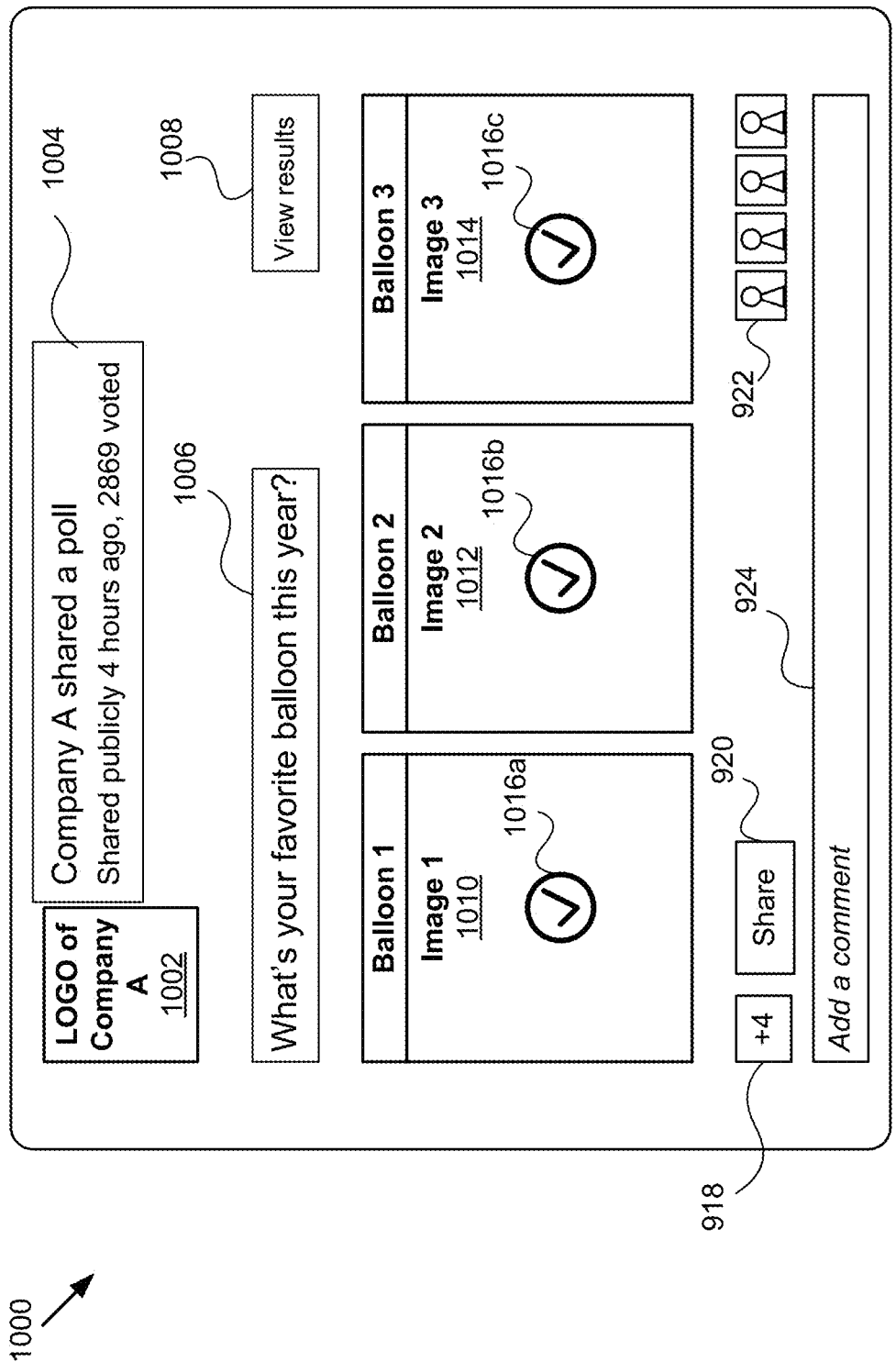
FIGS. 10A-10G are graphic representations of example user interfaces for processing a poll with a dynamic object.
Figure 10B:
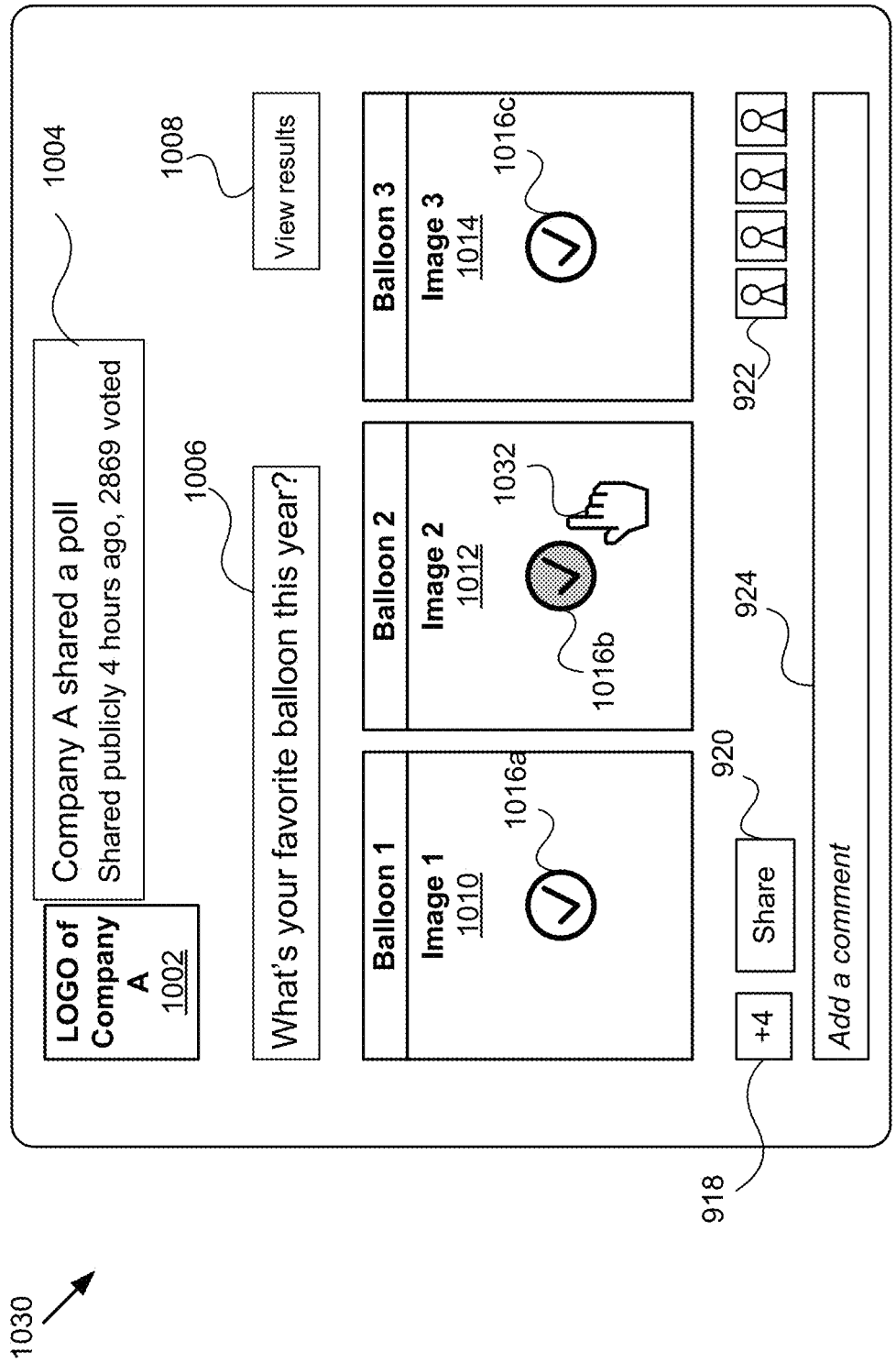
Figure 10C:
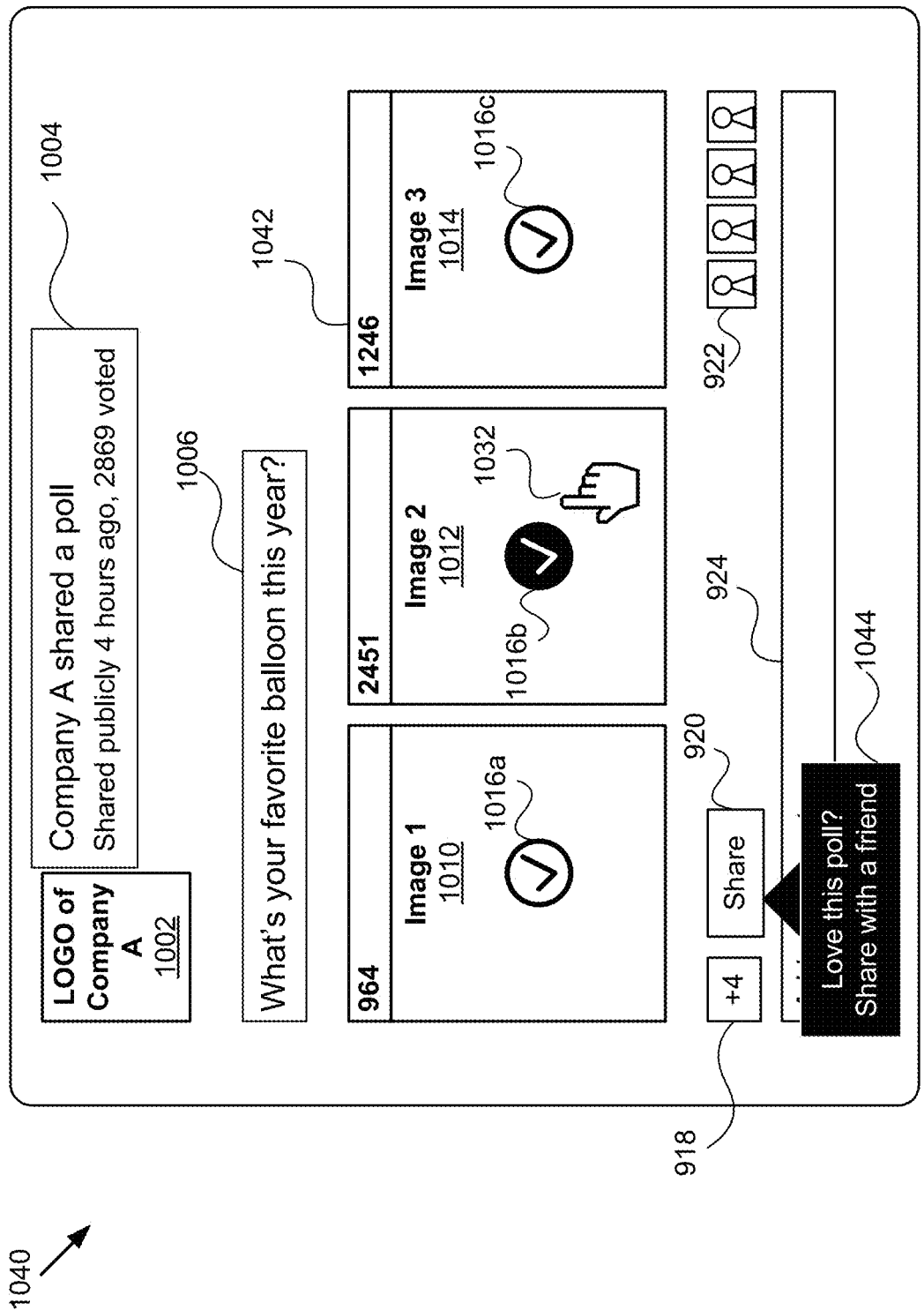

FIGS. 10A-G are graphic representations of example user interfaces for conducting a poll and presenting results with a dynamic object 302. More specifically, FIGS. 10A-10C show example user interfaces for a desktop environment. Again, common reference numbers are used for elements with the same or similar functionality as used in FIGS. 9A-9I.

FIG. 10A is a graphic representation of an example user interface 1000 generated by a dynamic object 302 for conducting a poll and presenting results in a desktop environment. The interface 1000 may include the logo 1002 of the company, and information 1004 identifying the company that share the poll, when the poll was shared and how many users saved the poll. The interface 1000 may also include other information 1006, in particular, the question being asked in the poll. In this example, the user is being asked what the user's favorite balloon is, e.g., from a holiday parade. The interface 1000 also includes a selectable button 1008 for viewing the results of the poll. Beneath the question being asked by the poll are a series of images 1010, 1012 and 1014, in this case three. Each of the images 1010, 1012, 1014 is labeled. Overlaid on each of the images is a selectable button 1016*a*, 1016*b*, 1016*c*. Below images 1010, 1012, 1014, the interface 1000 provides an indicator 918 of the number of users that have endorsed the offer, a button 920 for sharing the offer, a plurality of thumbnails 922 of users that have commented on the offer. The thumbnails 922 are selectable by the user to display the comment corresponding to the user's thumbnail. Finally, a comment area 924 is provided for the user to interact with the offer and post a comment about the offer.

Referring now to FIG. 10B, a modified interface 1030 showing the effects of the user beginning to make a selection of one of the choices in the poll by moving the cursor 1032 proximate one of the possible choices. Once the user moves the cursor 1032 over one of the choices, the interface 1000 of FIG. 10A transitions to the interface 1030 of FIG. 10B. This interface 1030 has many similar elements 1002, 1004, 1006, 1008, 918, 920, 922 and 924 similar to the interface 1000 of FIG. 10A. However, in the interface 1030 of FIG. 10B, the selection button 1016*b* is shaded to reflect that the user has positioned the cursor 1032 over the second image 1012.

Referring now to FIG. 10C, if the user selected button 1016*b* in the interface 1030 of FIG. 10B, the display transitions from the interface 1030 of FIG. 10B to the interface 1040 of FIG. 10C. The interface 940 includes many of the similar elements of the prior interfaces 1000, 1030; however, the select image button 1016*b* is inverted to white on black. Also the labels to the images are changed to indicate the number of votes cast for each image instead of the image title as in prior interfaces 1000, 1030. Interface 1040 is also modified to show a drop down box 1044 that is presented in response to selection of the share button 920. The drop down box 1044 allows the user to add a comment and share the offer with a friend. Doing so will allow the recipient friend to view the poll using the interface 1000 of FIG. 10A.

Referring now to FIGS. 10D-10G, example user interfaces for presenting a poll by a dynamic object 302 on a smart phone will be described.

Figure 10D:
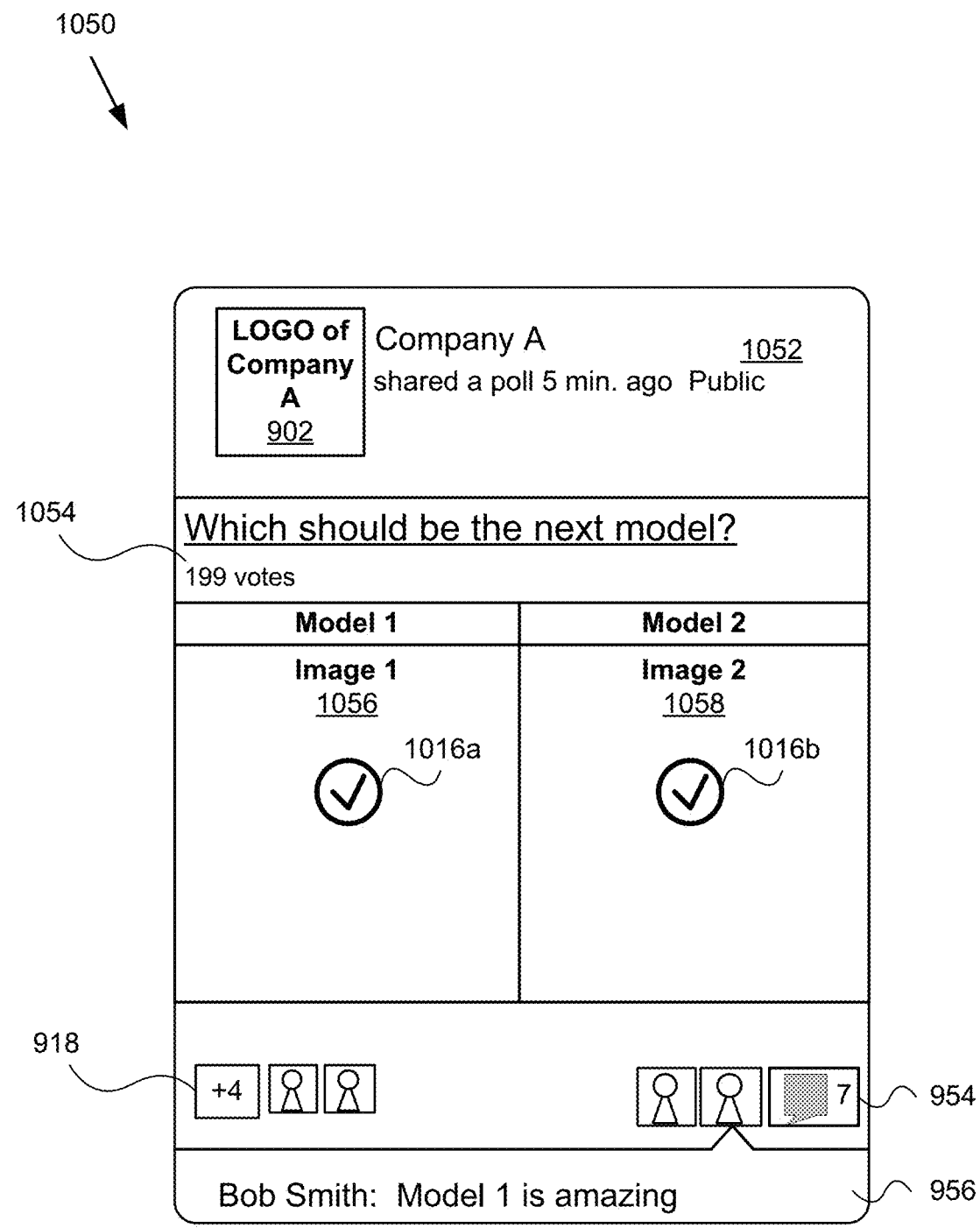

FIG. 10D illustrates an example interface 1050 generated by a dynamic object 302 for presentation of a poll on a smart phone. Again, like reference numbers are used for elements with the same or similar functionality as used in prior interfaces 1000, 1030, 1040. The interface 1050 includes a header 1052 having a company logo 902 and other information indicating that the company shared a poll and whether it is public. In this example, an auto company is presenting a poll asking users which of two different models they prefer. Below the header 1052 is a question area 1054 that presents the question that is the subject of the poll, and an indication of how many votes have been cast in the poll. Below the question area 1054 a pair of images 1056, 1058 are presented. Each image 1056, 1058 includes a title header specifying the model type and overlaid over the image 1056, 1058 is a selectable button 1016*a*, 1016*b* that allows the user to cast a vote. Beneath the images, the interface 1050 includes an indicator 918 of the number of users that have endorsed the poll, indicator 954 as to the number of comments and a comment area 956 showing a specific comment made by another user. It should be noted that the dynamic object 302 advantageously resizes the elements of the poll and provides them in a format with associated input logic so that they are usable on the form factor of a smart phone.

Figure 10E:
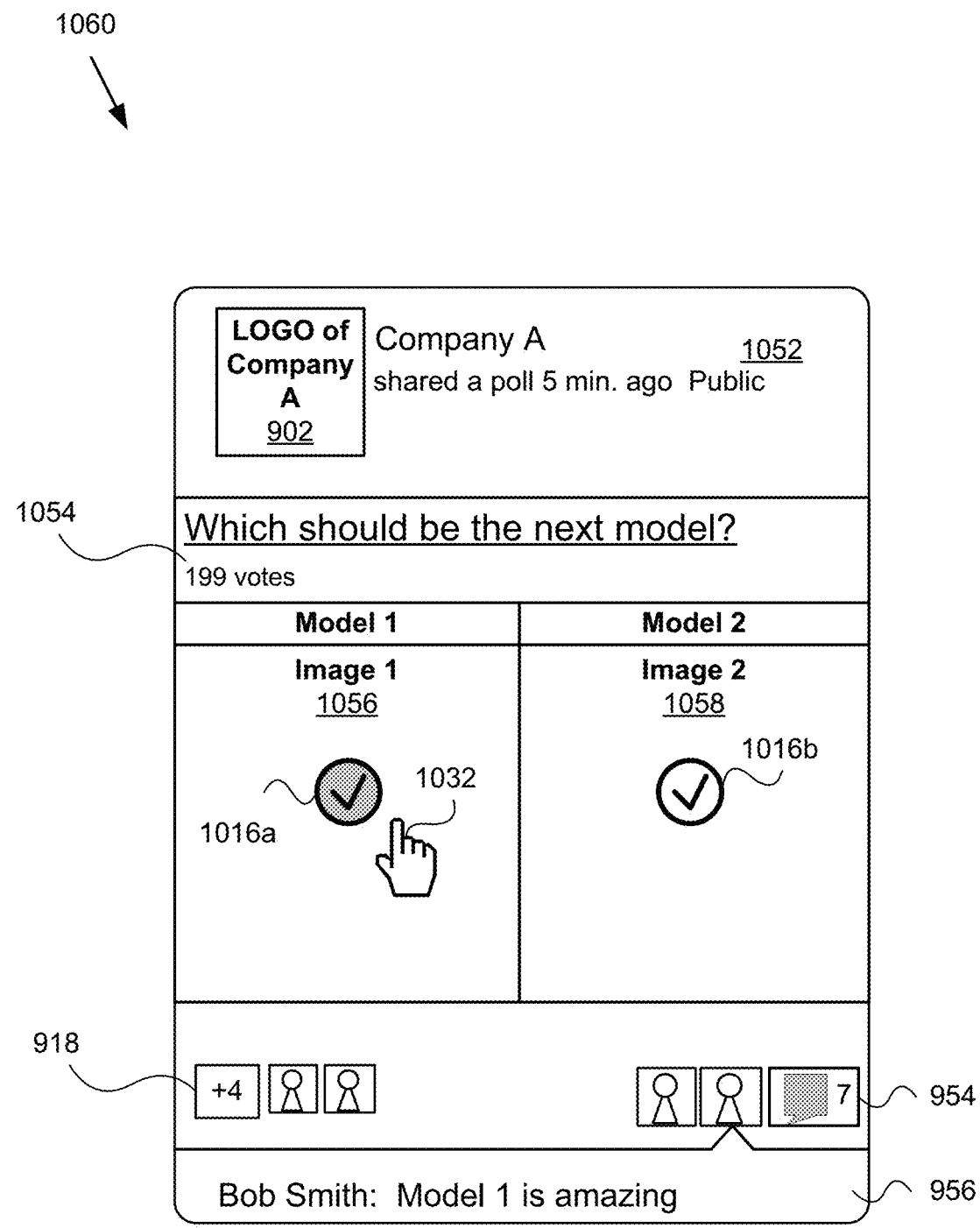

FIG. 10E shows the user interface 1060 showing the effects of the user beginning to make a selection of one of the choices in the poll by moving the cursor 1032 proximate one of the possible choices. Once the user moves a cursor 1032 over one of the choices, the interface 1050 of FIG. 10D transitions to the interface 1060 of FIG. 10E. This interface 1060 has many similar elements 1052, 1054, 1056, 1058, 918, 954 and 956 similar to the interface 1050 of FIG. 10D. However, in the interface 1060 of FIG. 10E, the selection button 1016a is shaded to reflect that the user is positioned the cursor 1032 over the first image 1056.

Figure 10F:
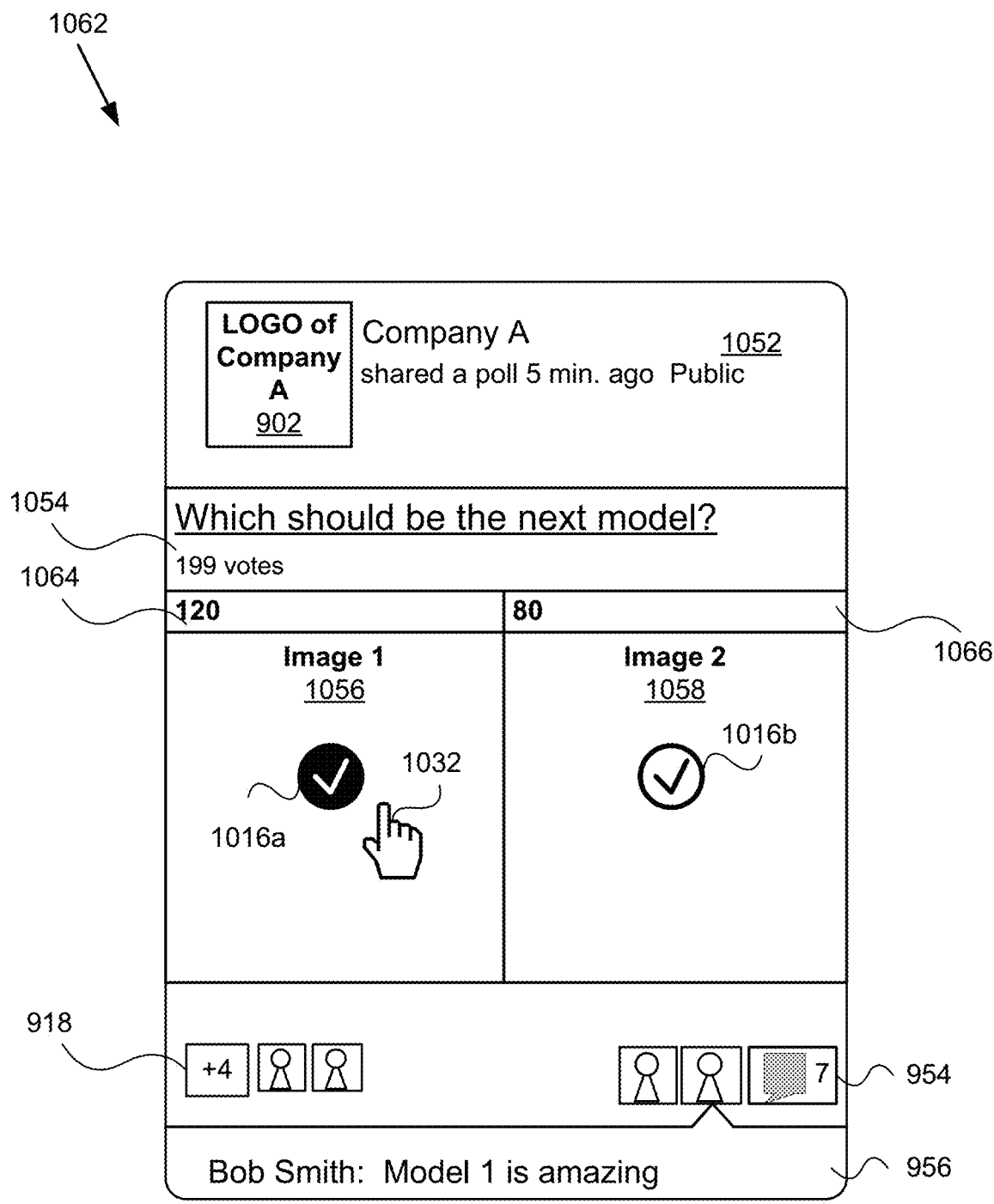

Referring now to FIG. 10F, if the user selected button 1016a in the interface 1060 of FIG. 10E, the display transitions from the interface 1060 of FIG. 10E to the interface 1062 of FIG. 10F. The interface 1062 includes many of the similar elements of the prior interfaces 1000, 1050; however, the select image button 1016a is inverted to white on black. Also the labels 1064, 1066 to the images 1056, 1058 are changed to indicate the number of votes cast for each image instead of the image title as in prior interfaces. In some implementations, the poll may have more than two possible options for selection in response to the question presented by the poll. In such a case, the images 1056, 1058 may be a visible portion of a filmstrip or slideshow that is selectable and may be shifted to left or to right to expose other images that may be selected in response to the poll. In some examples, a grid of images is presented and the images in the grid when selected are increased to cover a larger portion of the display before the selection button 1016 is presented over the image.

Figure 10G:
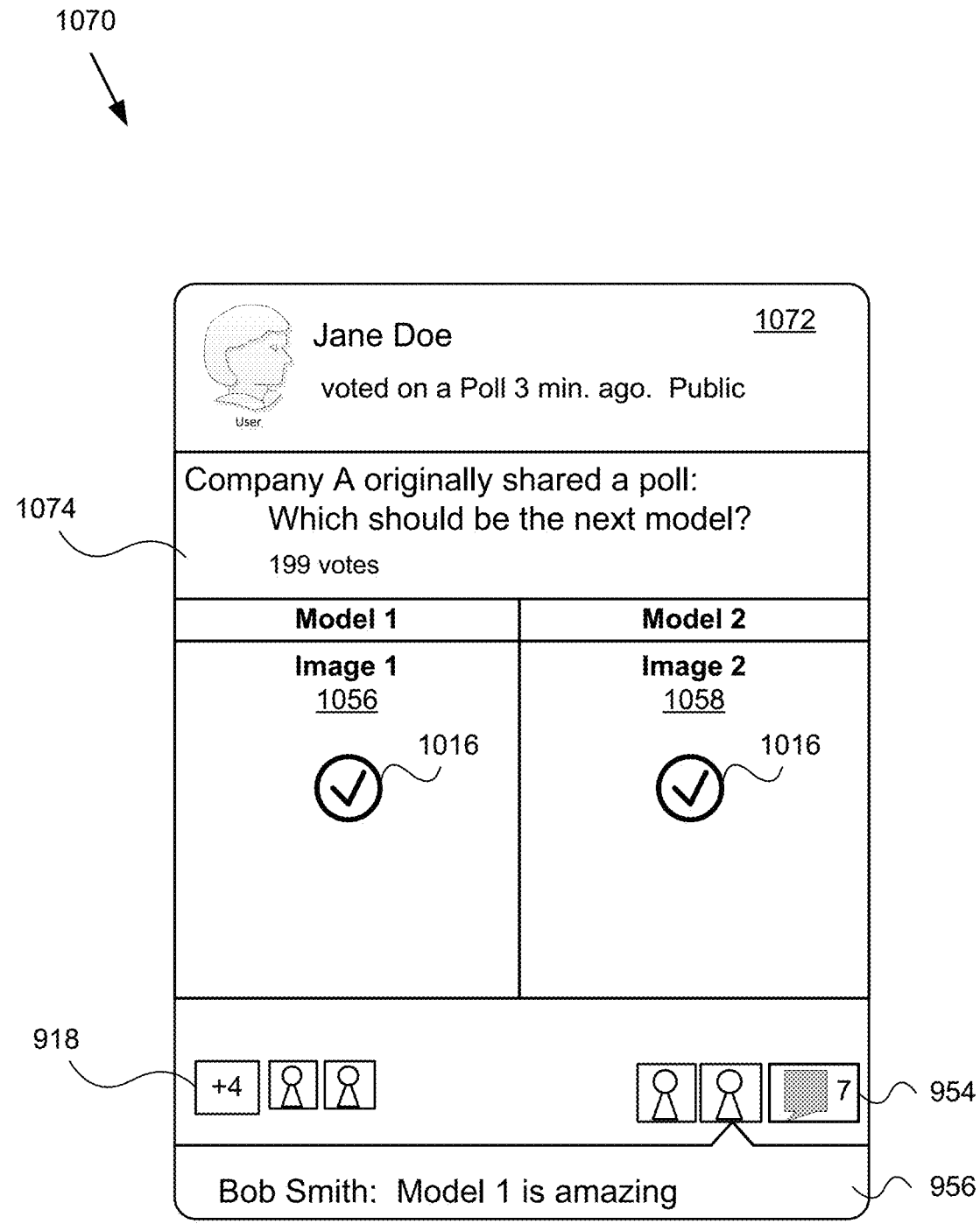

FIG. 10G shows an interface 1070 presented to a recipient user to which the original poll of FIG. 10 was forwarded or a recipient user who is the friend of another user who voted on the poll. The interface 1070 includes many of the similar elements of the prior interfaces 1000, 1050. However, in this example, the interface 1070 modifies the header 1072 to indicate the user who voted on the poll, provide the user's image and indicate that the user voted in the poll being presented. The area 1074 below the header 1072 may also include an introductory phrase indicating that the source of the original poll, company A's originally shared the poll, the poll question and the number of votes cast.

Figure 11A:
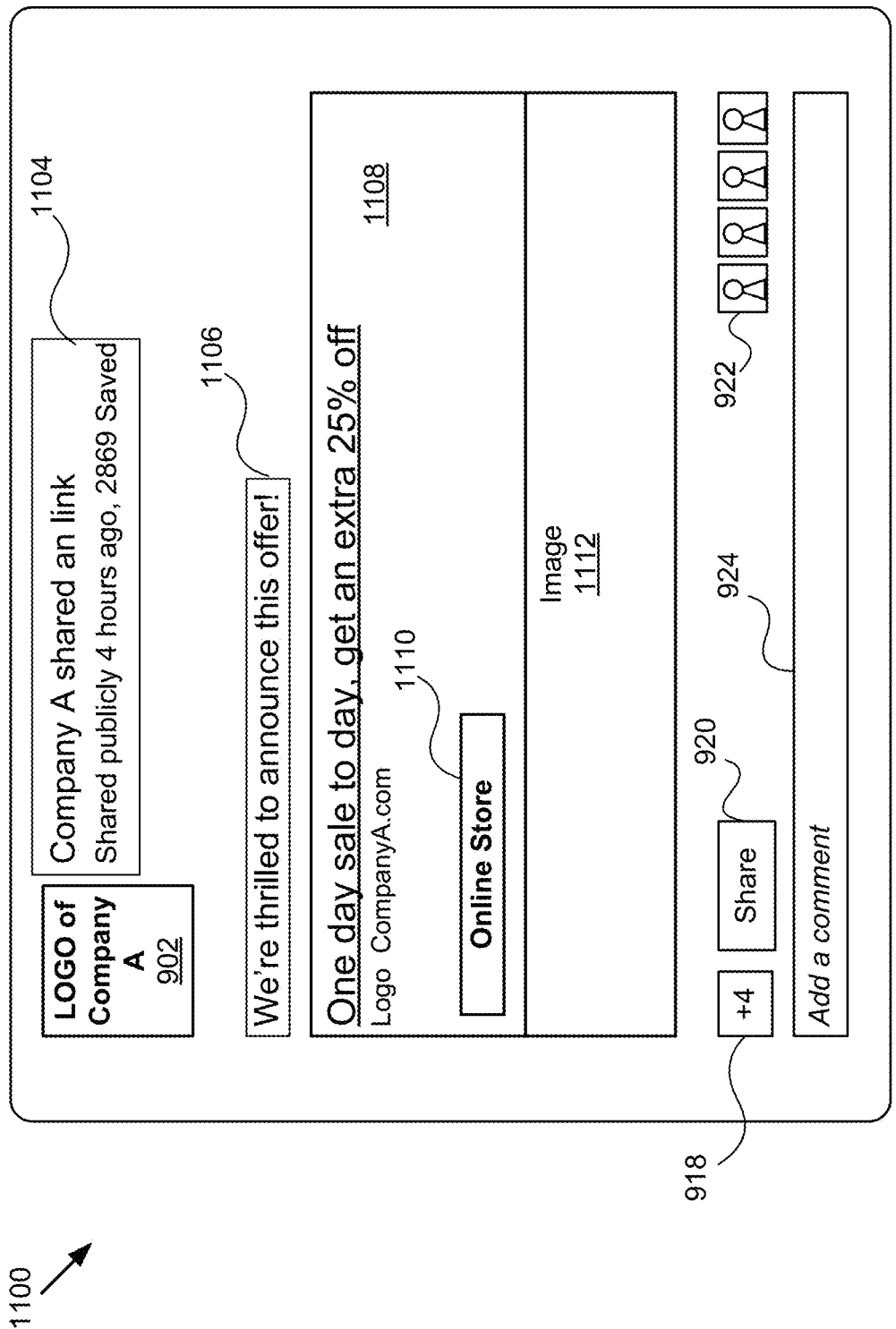
FIGS. 11A-11C are graphic representations of example user interfaces for processing a catalog or listing with a dynamic object.
Figure 11B:
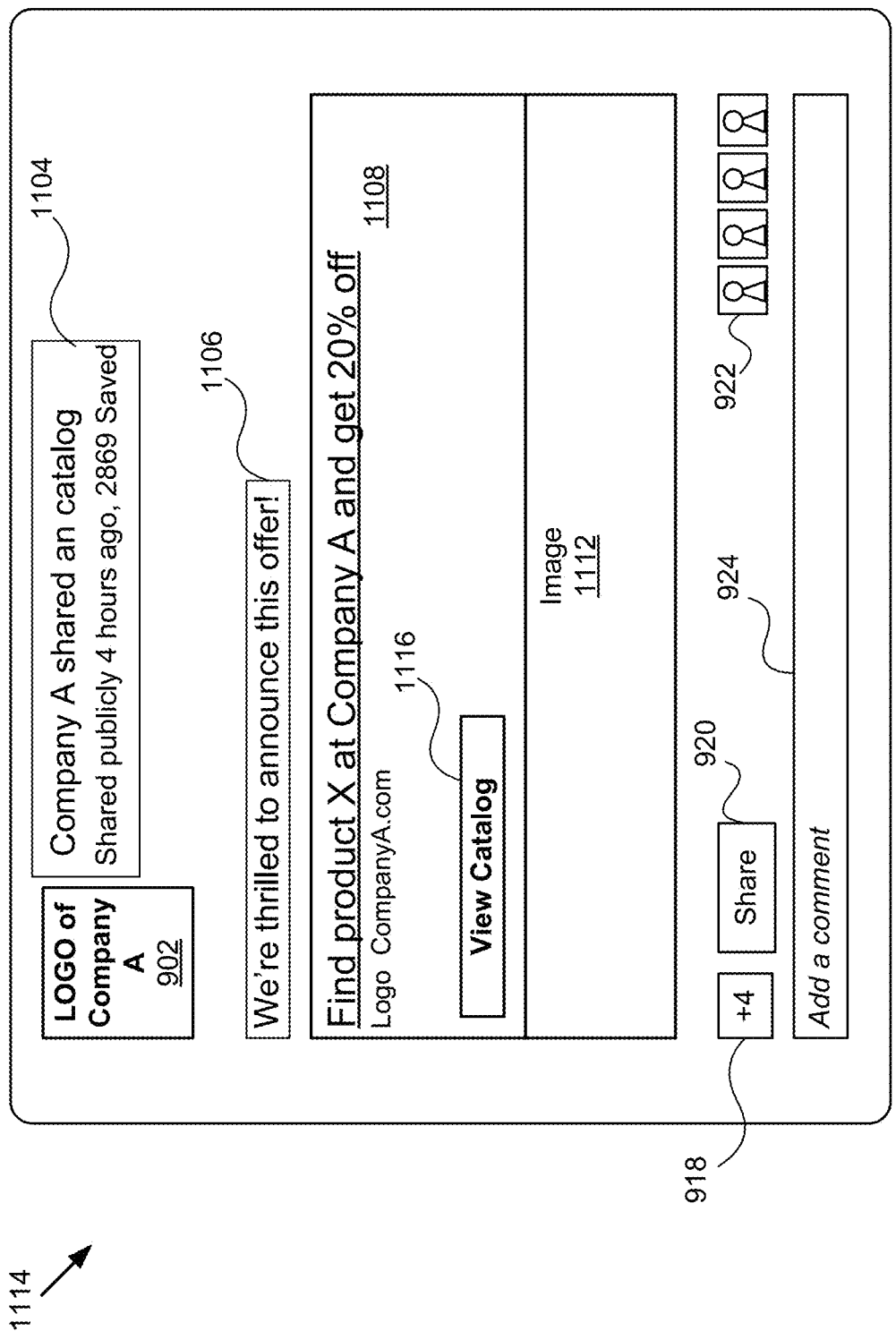
Figure 11C:
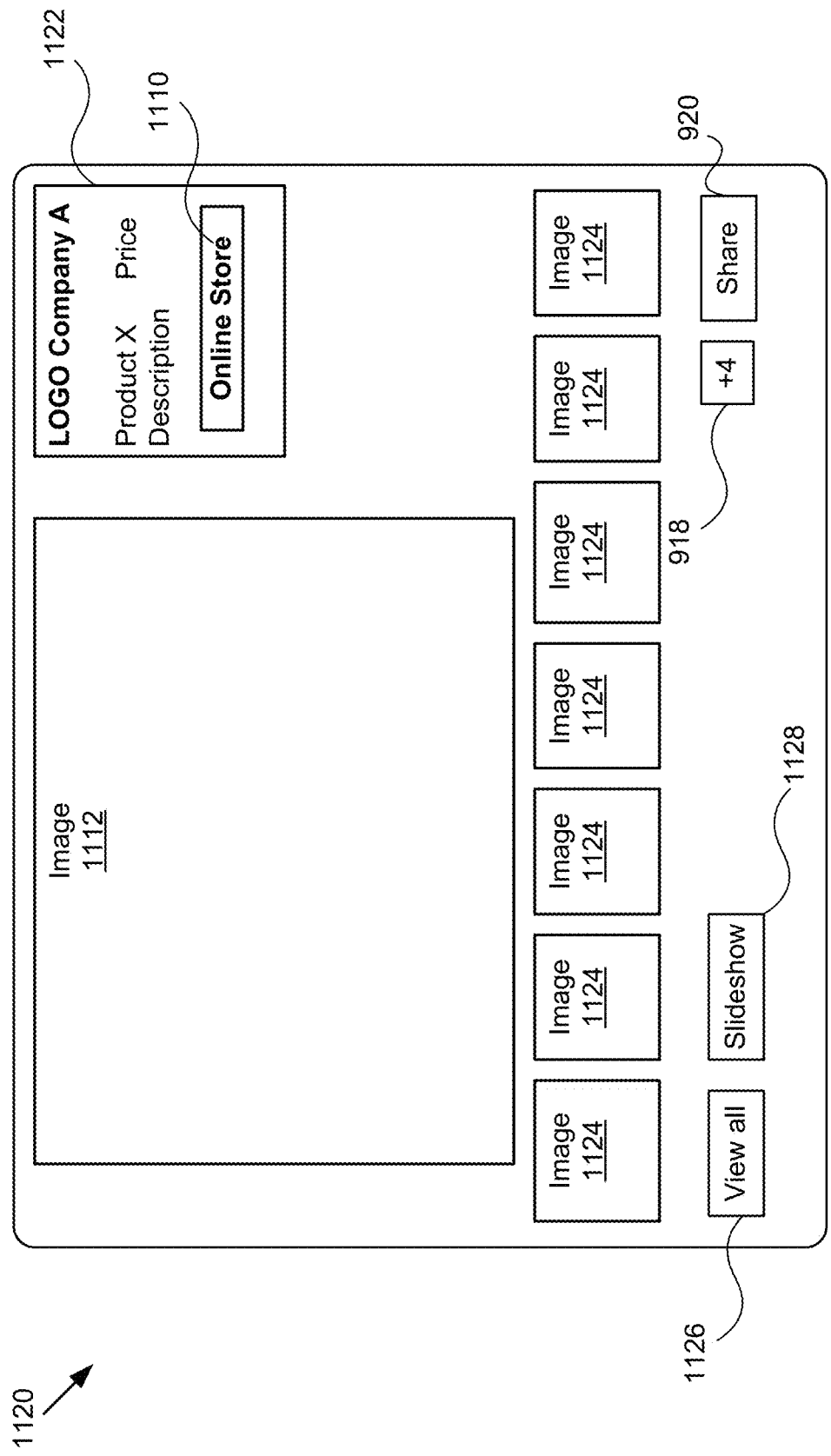

FIGS. 11A-11C are graphic representations of example user interfaces for presenting and interacting with a catalog or listing generated by a dynamic object 302.

FIG. 11A is a graphic representation of an example user interface 1100 generated by a dynamic object 302 for the presentation of a catalog or listing in a desktop environment. The interface 1100 may include the logo 902 of the company, and information 1104 identifying the company that shared a link, when the link was shared and how many users saved the link. The interface 1100 may also include other information 1106 to incentivize the user to access the catalog like an offer. The interface 1100 includes an information area 1108 that presents additional information. The information area 1108 also includes a selectable button 1110 for accessing an online store. The offer area 1108 may be provided with a background image 1112 or an image area 1112 adjacent to the information area 1108 may be provided. Below the image 1112, the interface 1100 provides an indicator 918 of the number of users that have endorsed the catalog, a button 920 for sharing the catalog, a plurality of thumbnails 922 of users that have commented on the catalog. The thumbnails 922 are selectable by the user to display the comment corresponding to the user's thumbnail 922. Finally, a comment area 924 is provided for the user to interact with the catalog and post a comment about the catalog.

FIG. 11B is a graphic representation of an example user interface 1114 generated by a dynamic object 302 for the presentation of a catalog or listing. This interface 1114 is similar to the interface 1100 of FIG. 11A. However, rather than providing a button 1110 for accessing online store, user interface 1114 of FIG. 11B provides a button 1116 for viewing a catalog. In response to selection of the view catalog button 1116, the interface transitions from the user interface 1114 of FIG. 11B to user interface 1120 of FIG. 11C.

FIG. 11C is a graphic representation of an example user interface 1120 for presenting a catalog generated by a dynamic object 302. The user interface 1120 includes a primary image 1112, an informational area 1122 and a plurality of thumbnail images 1124. The primary image 1112 occupies a majority of the user interface 1120. The primary image 1112 is positioned to the upper left of user interface 1120. In some embodiments, the primary image 1112 is the same image that was presented as part of the user interface 1114 of FIG. 11B just expanded in size and made the focal point of user interface 1120. The informational area 1122 is positioned to the left of the image 1112. The informational area of 1122 may include the logo of the company, a product description, and a price. The informational area 1122 may also include a button 1110 to transition the user to the online store. The plurality of thumbnail images 1124 are positioned in a row beneath the primary image 1112. The thumbnail images 1124 are selectable by the user, and when selected the primary image 1112 is updated to match the selected thumbnail. The interface 1120 also includes a button 1126 for viewing all products, a button 1128 for viewing the images as a slideshow, and indicator 918 of how many users have endorsed the catalog, and finally, a button 920 for sharing the catalog.

Figure 12A:
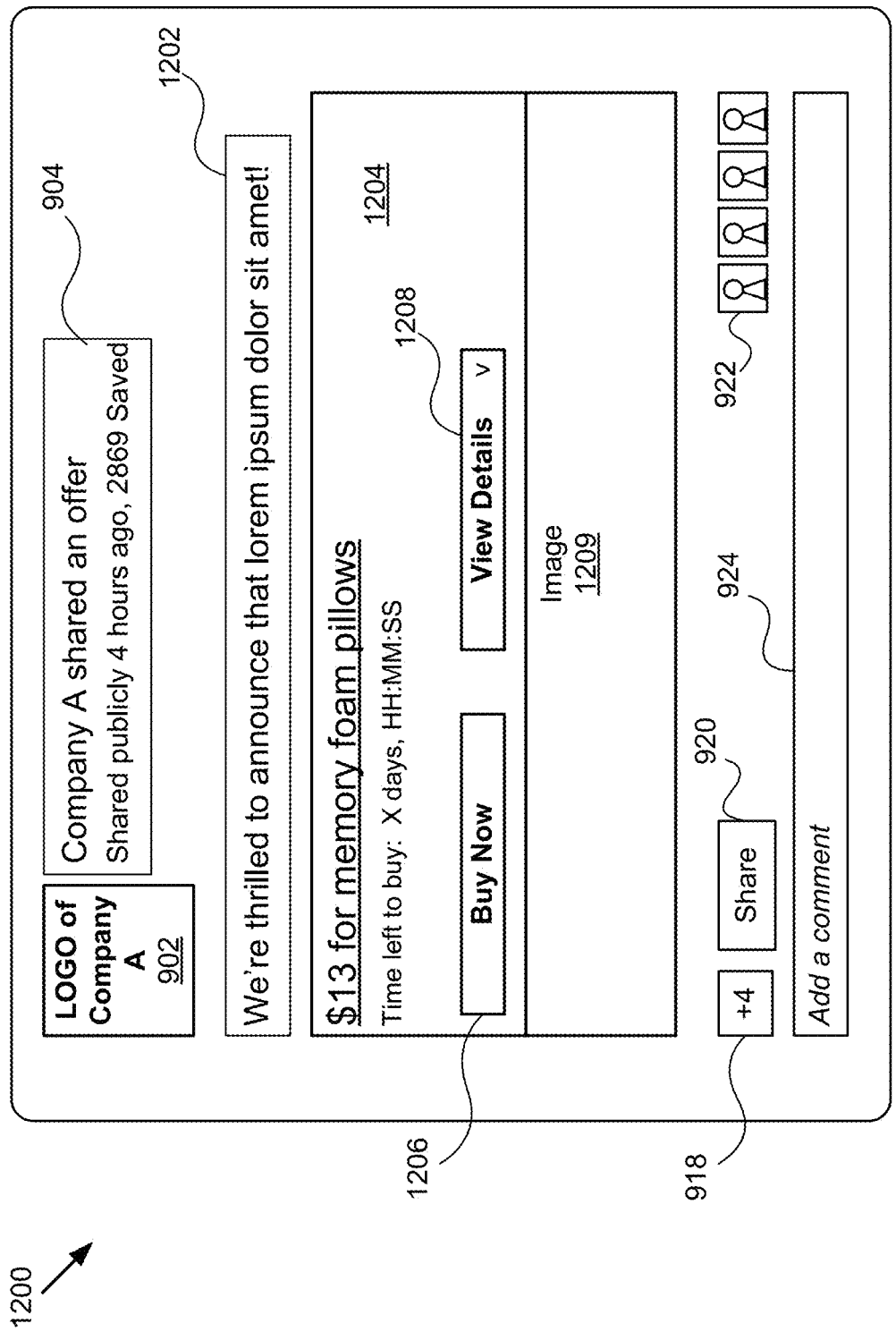
FIGS. 12A-12C are graphic representations of example user interfaces for processing a transaction with a dynamic object.
Figure 12B:
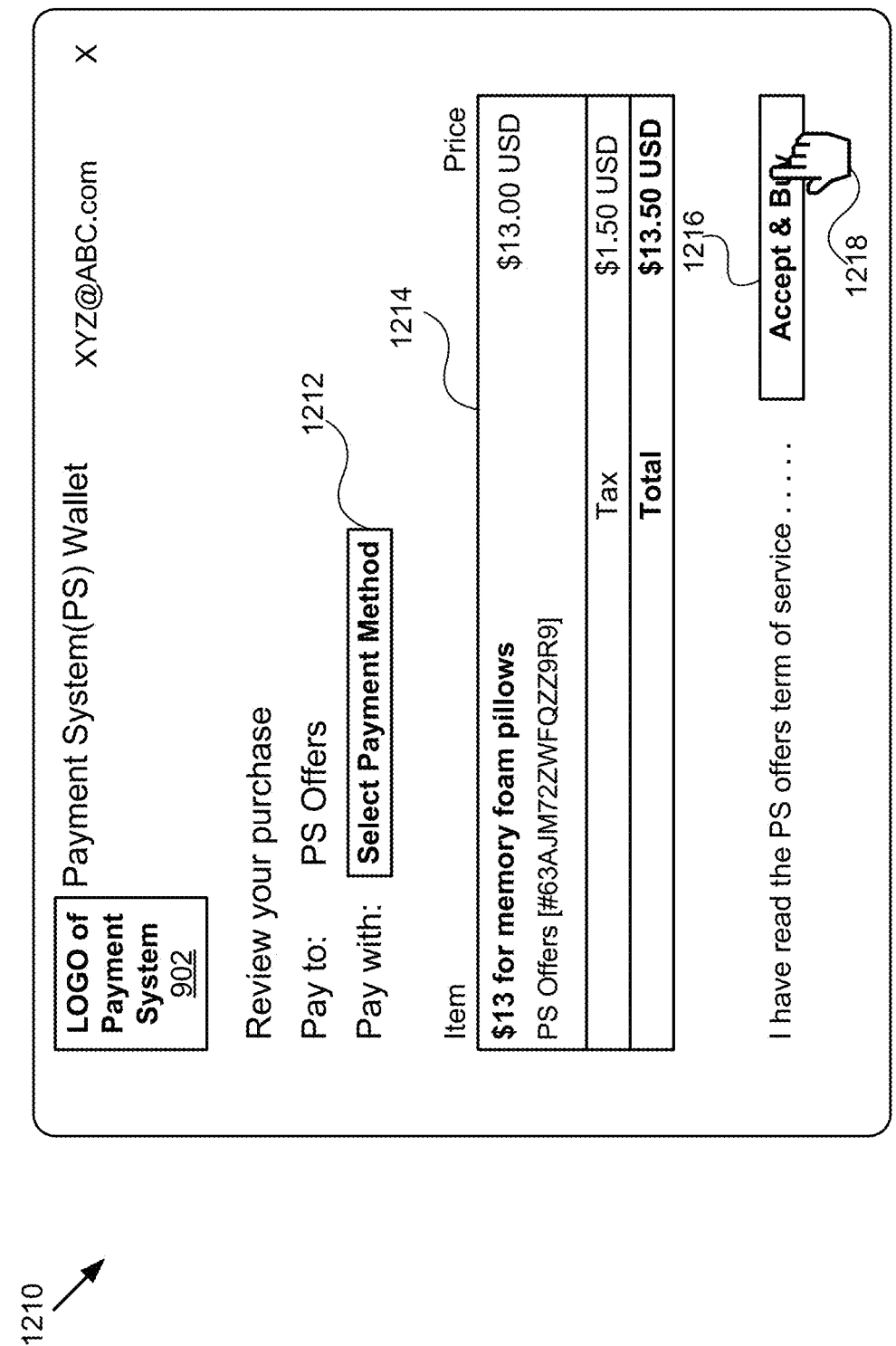
Figure 12C:
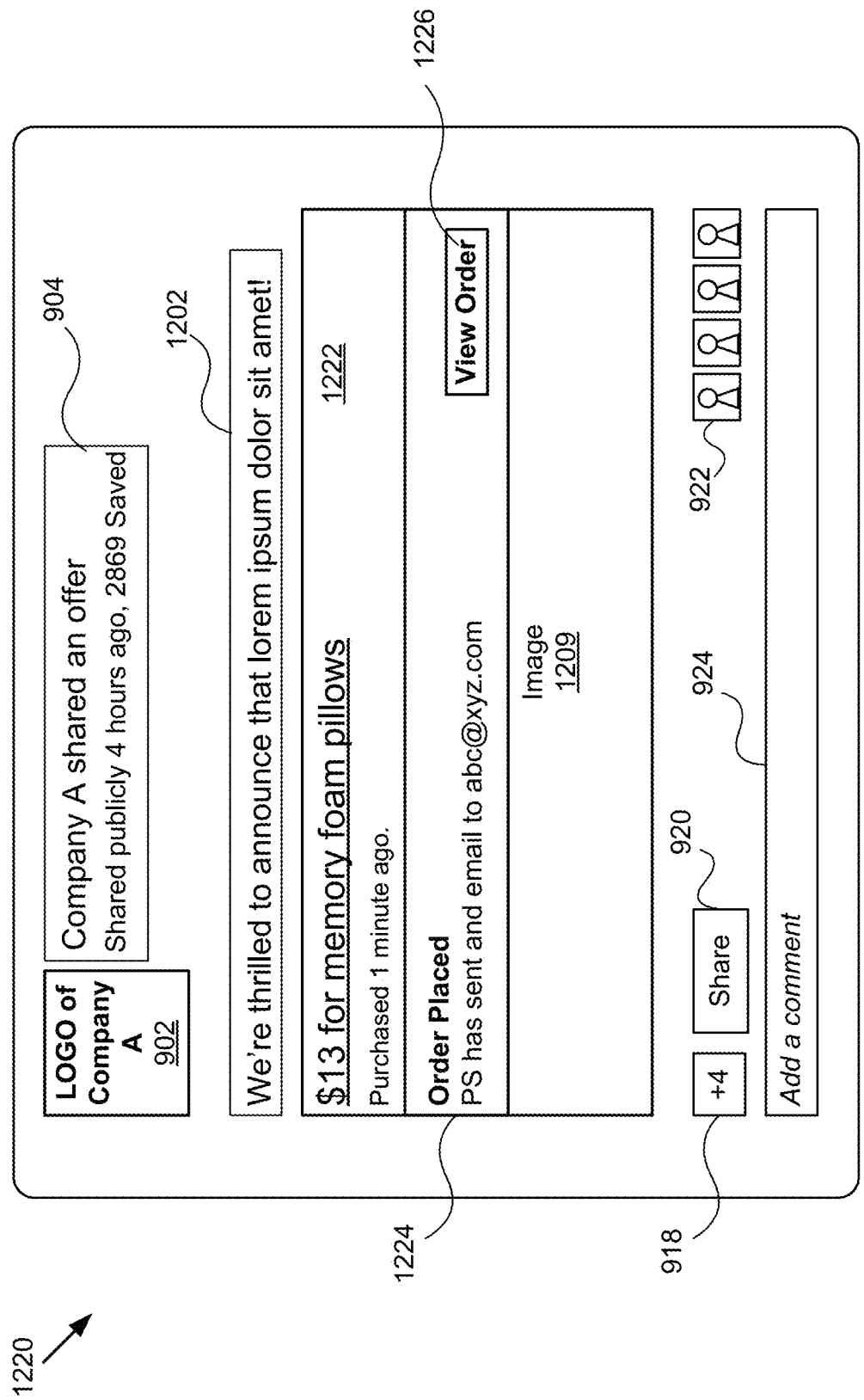

FIGS. 12A-12C are graphic representations of example user interfaces for processing a transaction with a dynamic object 302.

FIG. 12A is a graphic representation of an example user interface 1200 generated by a dynamic object 302 for processing a transaction in the context of an offer in a desktop environment. The interface 1200 may include the logo 902 of the company, and information 904 identifying the company that shared the offer, when the offer was shared and how many users saved the offer. The interface 1200 may also include other information 1202 about the offer or the transaction. The interface 1200 includes a transaction area 1204 that includes an offer and some information about completing a transaction such as the amount of time left. The transaction area of 1204 also includes a button 1206 to start the transaction and a view details button 1208 to view more information about the transaction. The transaction area 1204 may be provided with a background image 1209 or an image area 1209 below to the transaction area 1204 may be provided. Below the image 1209, the interface 1200 provides an indicator 918 of the number of users that have endorsed the offer, a button 920 for sharing the offer, a plurality of thumbnails 922 of users that have commented on the offer. The thumbnails 922 are selectable by the user to display the comment corresponding to the user's thumbnail image. Finally, a comment area 924 is provided for the user to interact with the offer and post a comment about the offer.

FIG. 12B is a graphic representation of an example user interface 1210 generated by a dynamic object 302 in response to user selection of the buy now button 1206 of FIG. 12A. The user interface 1210 of FIG. 12B includes a logo of the payment system 902, details about the transaction, a button 1212 for selecting the payment method, and a detailed accounting 1214 of the item being purchased in the transaction and its cost. The user interface 1210 also includes an Accept & Buy button 1216 to complete the transaction. FIG. 12B shows the interface 1210 with a cursor 1218 and the user selecting Accept & Buy button 1216.

In response to selection of the Accept & Buy button 1216 by the user, the dynamic object 302 causes the interface 1210 to transition from that of FIG. 12B to the user interface 1220 of FIG. 12C. The user interface 1220 of FIG. 12C includes many similar elements to the user interface 1200 of FIG. 12A. The user interface 1220 includes the logo 902, information 904 identifying the offer, information area 1202 describing the transaction and other interface elements 918, 920, 922 and 924. The user interface 1220 also includes a transaction summary 1222, an order confirmation 1224 and the image 1209 of the purchase product. The transaction summary 1222 provides the title of the purchased item, the price and information about when the transaction was completed. The order confirmation 1224 provides an indication that the order is been placed, and that a confirmation email has been sent to an email address. The order confirmation area 1224 also includes a selectable button 1226 for viewing the order. The user interfaces of FIG. 12A-12C are particularly advantageous because they allow the transaction to be completed with a few steps and in the context in which the offer was presented.

Figure 13A:
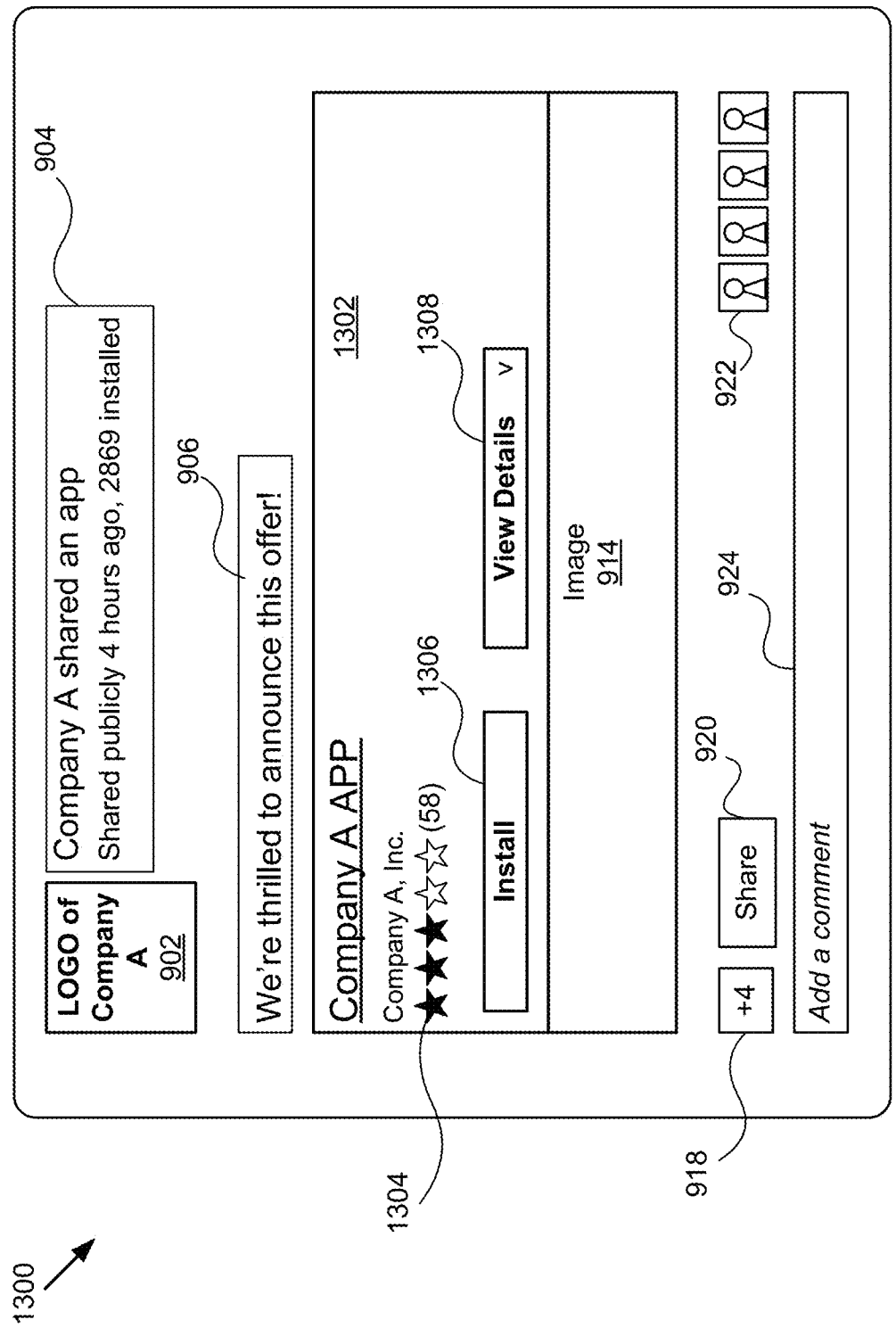
FIGS. 13A-13C are graphic representations of example user interfaces for installing an application with a dynamic object.
Figure 13B:
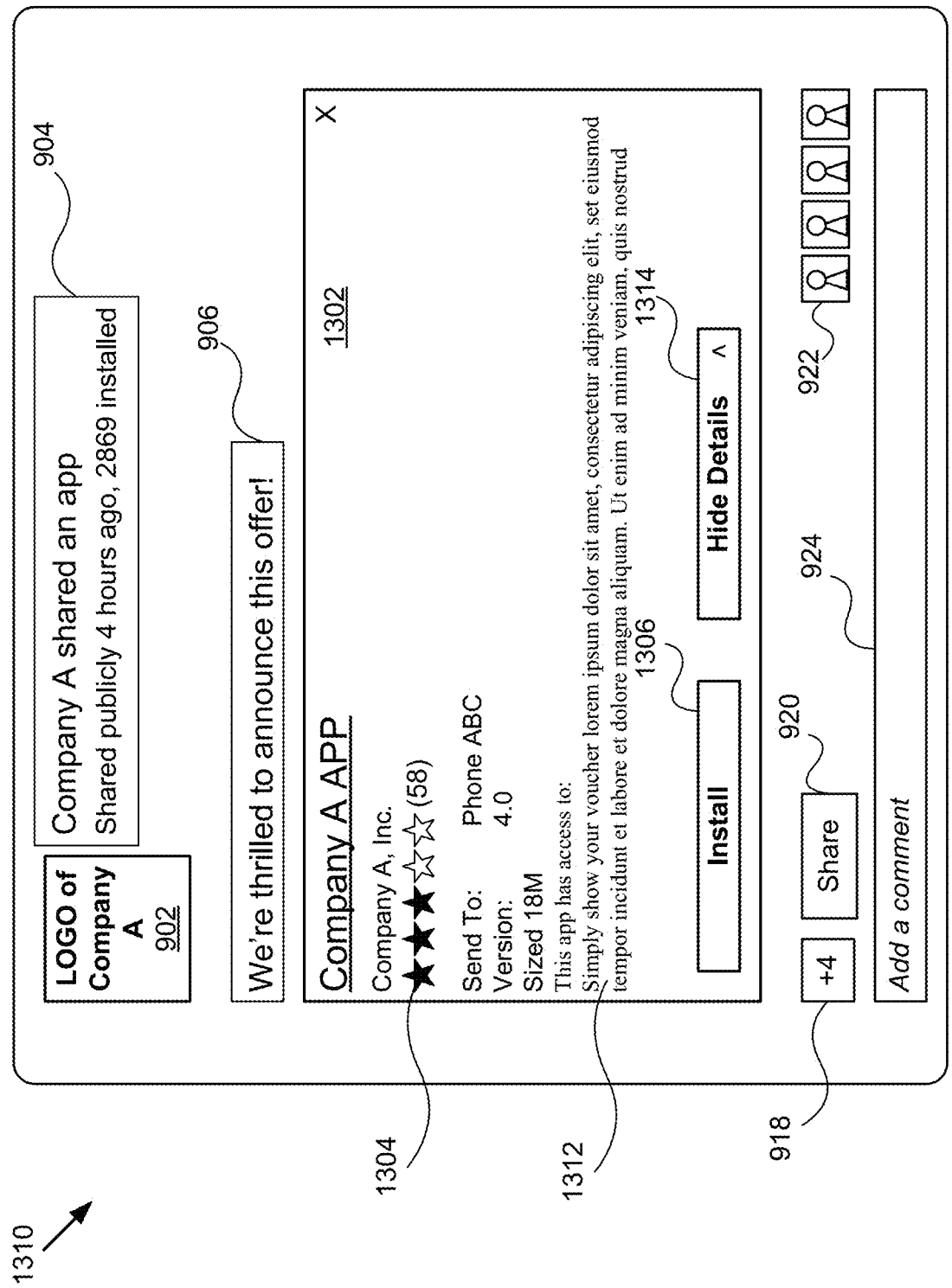
Figure 13C:
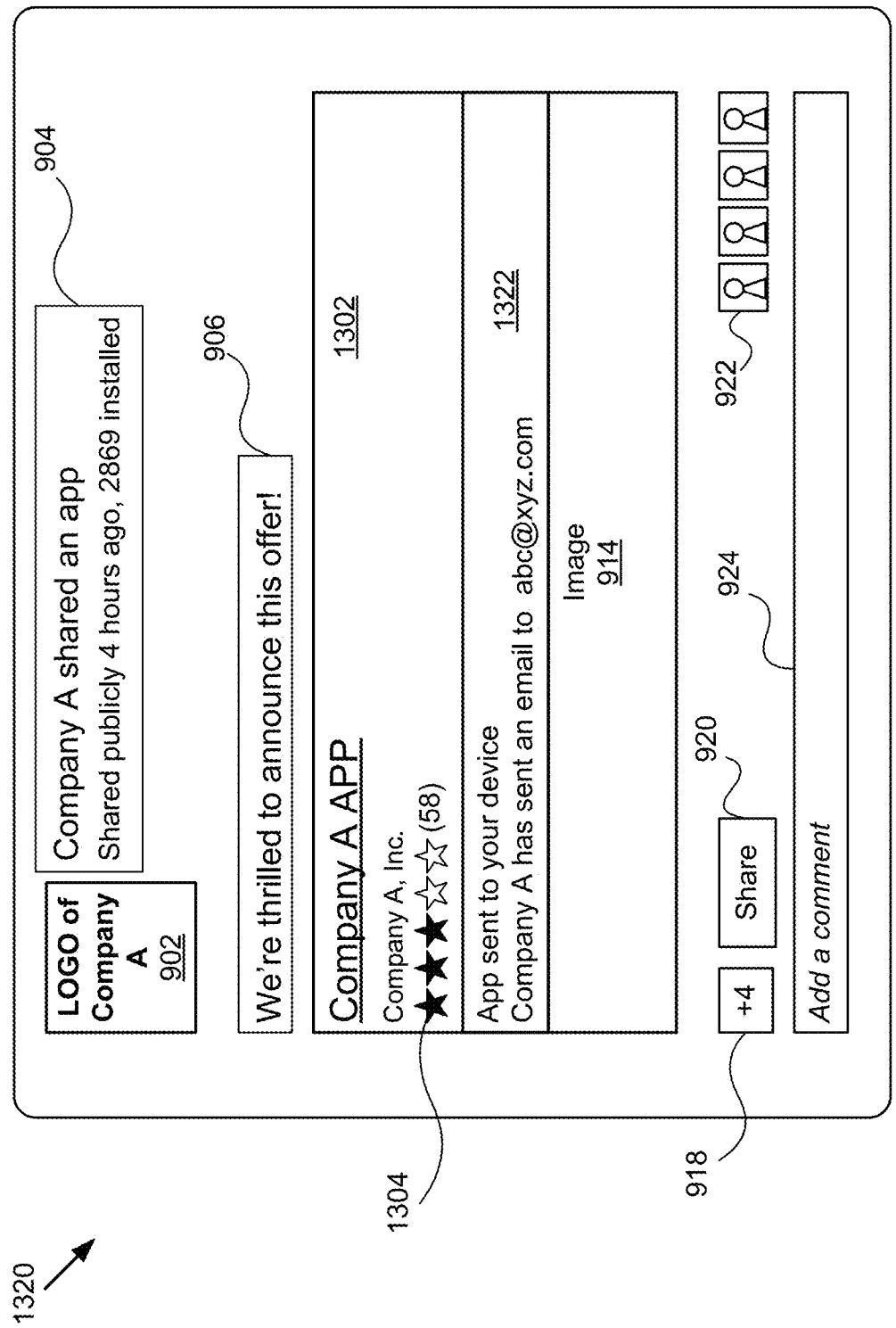

FIGS. 13A-13C are graphic representations of example user interfaces for installing an application with a dynamic object 302.

FIG. 13A shows a graphic representation of an example user interface 1300 generated by the dynamic object 302 for presentation of an application for installation. The user interface 1300 has elements 902, 904, 906, 914, 918, 920, 922 and 924 similar to other interfaces as has been described above and those elements have the same functionality here. The application installation interface 1300 provides an application area 1302 that provides information about the application such as its title, rating 1304 and other information. The application area 1302 also provides an installation button 1306 and a view details button 1308.

In response to selection of the view details button 1308 by the user, the display transitions from showing user interface 1300 of FIG. 13A to showing user interface 1310 of FIG. 13B. In the user interface 1310 of FIG. 13B, the application area 1302 is expanded over the image 914. The application area 1302 is supplemented with additional information 1312, for example, where the application is being sent, the version of the application, the size of the application and other information describing the application. The application area 1302 continues to have the install button 1306 but the more detail button 1308 is replaced by a hide details button 1314. The hide details button 1314 when selected will transition the display from the interface 1310 of FIG. 13B back to the interface 1300 of FIG. 13A.

In response to selection of the installation button 1306 by the user, the display transitions from showing user interface 1300 of FIG. 13A to showing user interface 1320 of FIG. 13C. In the user interface 1310 of FIG. 13B, a portion of the application area 1302 is replaced with an application status area 1322. The application status area 1322 notifies the user that the app has been sent to the user's portable device and the provider of the application has sent an email to the email address identified in the application status area 1322.

Systems and methods for generating and processing a dynamic object have been described. While the present disclosure is described above primarily in the context of a social network, it should be understood that the dynamic objects 302 may operate on any of the components of the system shown in FIG. 1, and may even operate on other platforms in addition to those shown in FIG. 1.

In the above description, for purposes of explanation, numerous specific details were set forth. It will be apparent, however, that the disclosed technologies can be practiced without any given subset of these specific details. In other instances, structures and devices are shown in block diagram form. For example, the disclosed technologies are described in some implementations above with reference to user interfaces and particular hardware. Moreover, the technologies disclosed above primarily in the context of on line services; however, the disclosed technologies apply to other data sources and other data types (e.g., collections of other resources for example images, audio, web pages).

Reference in the specification to "one implementation" or "an implementation" means that a particular feature, structure, or characteristic described in connection with the implementation is included in at least one implementation of the disclosed technologies. The appearances of the phrase "in one implementation" in various places in the specification are not necessarily all referring to the same implementation.

Some portions of the detailed descriptions above were presented in terms of processes and symbolic representations of operations on data bits within a computer memory. A process can generally be considered a self-consistent sequence of steps leading to a result. The steps may involve physical manipulations of physical quantities. These quantities take the form of electrical or magnetic signals capable of being stored, transferred, combined, compared, and otherwise manipulated. These signals may be referred to as being in the form of bits, values, elements, symbols, characters, terms, numbers or the like.

These and similar terms can be associated with the appropriate physical quantities and can be considered labels applied to these quantities. Unless specifically stated otherwise as apparent from the prior discussion, it is appreciated that throughout the description, discussions utilizing terms for example "processing" or "computing" or "calculating" or "determining" or "displaying" or the like, may refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The disclosed technologies may also relate to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, for example, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The disclosed technologies can take the form of an entirely hardware implementation, an entirely software implementation or an implementation containing both hardware and software elements. In some implementations, the technology is implemented in software, which includes but is not limited to firmware, resident software, microcode, etc.

Furthermore, the disclosed technologies can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A computing system or data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the processes and displays presented herein may not be inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the disclosed technologies were not described with reference to any particular programming language. It will be appreciated that a variety of programming languages may be used to implement the teachings of the technologies as described herein.

The foregoing description of the implementations of the present techniques and technologies has been presented for the purposes of illustration and description. It is not intended to be exhaustive or to limit the present techniques and technologies to the precise form disclosed. Many modifications and variations are possible in light of the above teaching. It is intended that the scope of the present techniques and technologies be limited not by this detailed description. The present techniques and technologies may be embodied in other specific forms without departing from the spirit or essential characteristics thereof. Likewise, the particular naming and division of the modules, routines, features, attributes, methodologies and other aspects are not mandatory or significant, and the mechanisms that implement the present techniques and technologies or its features may have different names, divisions and/or formats. Furthermore, the modules, routines, features, attributes, methodologies and other aspects of the present technology can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, and/or in every and any other way known now or in the future in computer programming. Additionally, the present techniques and technologies are in no way limited to implementation in any specific programming language, or for any specific operating system or environment. Accordingly, the disclosure of the present techniques and technologies is intended to be illustrative, but not limiting.

What is claimed is:

1. A computer-implemented method comprising:
   providing, by one or more social networking servers, a social network user interface for presentation to a user, the social network user interface including a dynamic object that includes (i) rich content, (ii) a control for saving the rich content included in the dynamic object, and (iii) a trigger condition that is other than an elapsing of time and that the creator of the dynamic object has associated with re-presenting saved rich content;
   receiving, by the one or more social networking servers, an indication that the user has selected, on the social network user interface, the control for saving the rich content included in the dynamic object;
   determining, by the one or more social networking servers, that the trigger condition that is included in the dynamic object has been satisfied;
   in response to determining that the trigger condition that is included in the dynamic object has been satisfied, providing, by the one or more social networking servers, an updated social user interface for presentation the user, the updated social network user interface re-presenting the dynamic object that includes the rich content;
   determining, by the one or more social networking servers, that the user has interacted with the rich content included in the dynamic object that was re-presented on the updated user interface; and
   generating, by the one or more social networking servers, analytics parameters for use in generating aggregated analytics statistics for the dynamic object based at least on determining that the user has interacted with the rich content included in the dynamic object that was re-presented in the updated social network user interface.

2. The method of claim 1, wherein the trigger condition included in the dynamic object specifies a user geographic location in which saved rich content is to be re-presented.

3. The method of claim 1, wherein the trigger condition included in the dynamic object specifies a user activity that, when detected, triggers re-presentation of the saved rich content.

4. The method of claim 1, wherein the trigger condition included in the dynamic object specifies a particular person or other person that, when contacted by the user, triggers re-presentation of the saved rich content.

5. The method of claim 1, wherein the trigger condition included in the dynamic object species a topic of a post that, when viewed by the user, triggers re-presentation of the saved rich content.

6. The method of claim 1, wherein the trigger condition included in the dynamic object specifies an authoring entity whose posts, when viewed by the user, trigger re-presentation of the saved rich content.

7. The method of claim 1, wherein the rich content comprises a poll or survey.

8. The method of claim 1, wherein the rich content comprises an advertisement or offer.

9. A system comprising:
one or more processing devices;
one or more non-transitory machine-readable storage devices storing instructions that are executable by the one or more processing devices to cause performance of operations comprising:
providing, by one or more social networking servers, a social network user interface for presentation to a user, the social network user interface including a dynamic object that includes (i) rich content, (ii) a control for saving the rich content included in the dynamic object, and (iii) a trigger condition that is other than an elapsing of time and that the creator of the dynamic object has associated with re-presenting saved rich content;
receiving, by the one or more social networking servers, an indication that the user has selected, on the social network user interface, the control for saving the rich content included in the dynamic object;
determining, by the one or more social networking servers, that the trigger condition that is included in the dynamic object has been satisfied;
in response to determining that the trigger condition that is included in the dynamic object has been satisfied, providing, by the one or more social networking servers, an updated social user interface for presentation the user, the updated social network user interface re-presenting the dynamic object that includes the rich content;
determining, by the one or more social networking servers, that the user has interacted with the rich content included in the dynamic object that was re-presented on the updated user interface; and
generating, by the one or more social networking servers, analytics parameters for use in generating aggregated analytics statistics for the dynamic object based at least on determining that the user has interacted with the rich content included in the dynamic object that was re-presented in the updated social network user interface.

10. The system of claim 9, wherein the trigger condition included in the dynamic object specifies a user geographic location in which saved rich content is to be re-presented.

11. The system of claim 9, wherein the trigger condition included in the dynamic object specifies a user activity that, when detected, triggers re-presentation of the saved rich content.

12. The system of claim 9, wherein the trigger condition included in the dynamic object specifies a particular person or other person that, when contacted by the user, triggers re-presentation of the saved rich content.

13. The system of claim 9, wherein the trigger condition included in the dynamic object species a topic of a post that, when viewed by the user, triggers re-presentation of the saved rich content.

14. The system of claim 9, wherein the trigger condition included in the dynamic object specifies an authoring entity whose posts, when viewed by the user, trigger re-presentation of the saved rich content.

15. The system of claim 9, wherein the rich content comprises a poll or survey.

16. A non-transitory machine-readable storage device storing instructions that are executable by a processing device to cause performance of operations comprising:
providing, by one or more social networking servers, a social network user interface for presentation to a user, the social network user interface including a dynamic object that includes (i) rich content, (ii) a control for saving the rich content included in the dynamic object, and (iii) a trigger condition that is other than an elapsing of time and that the creator of the dynamic object has associated with re-presenting saved rich content;
receiving, by the one or more social networking servers, an indication that the user has selected, on the social network user interface, the control for saving the rich content included in the dynamic object;
determining, by the one or more social networking servers, that the trigger condition that is included in the dynamic object has been satisfied;
in response to determining that the trigger condition that is included in the dynamic object has been satisfied, providing, by the one or more social networking servers, an updated social user interface for presentation the user, the updated social network user interface re-presenting the dynamic object that includes the rich content;
determining, by the one or more social networking servers, that the user has interacted with the rich content included in the dynamic object that was re-presented on the updated user interface; and
generating, by the one or more social networking servers, analytics parameters for use in generating aggregated analytics statistics for the dynamic object based at least on determining that the user has interacted with the rich content included in the dynamic object that was re-presented in the updated social network user interface.

17. The device of claim 16, wherein the trigger condition included in the dynamic object specifies a user geographic location in which saved rich content is to be re-presented.

18. The device of claim 16, wherein the trigger condition included in the dynamic object specifies a user activity that, when detected, triggers re-presentation of the saved rich content.

19. The device of claim 16, wherein the trigger condition included in the dynamic object specifies a particular person or other person that, when contacted by the user, triggers re-presentation of the saved rich content.

20. The device of claim 16, wherein the trigger condition included in the dynamic object species a topic of a post that, when viewed by the user, triggers re-presentation of the saved rich content.

* * * * *